United States Patent [19]

Allen

[11] Patent Number: 5,379,355

[45] Date of Patent: Jan. 3, 1995

[54] DATA ENCODING USING ONE OR MORE ADAPTIVE DECISION TREES

[75] Inventor: James D. Allen, Castro Valley, Calif.

[73] Assignees: Ricoh Corporation, Menlo Park, Calif.; Ricoh Company Ltd., Tokyo, Japan

[21] Appl. No.: 934,764

[22] Filed: Aug. 24, 1992

[51] Int. Cl.$^6$ .......................... G06K 9/36; H04B 1/66
[52] U.S. Cl. ........................... 382/56; 375/122
[58] Field of Search .................. 382/56, 49, 36, 37, 382/38; 358/432, 433, 135, 136, 133; 341/79, 86, 94, 77, 143; 375/30, 122

[56] References Cited

U.S. PATENT DOCUMENTS

| | | | |
|---|---|---|---|
| 4,813,056 | 3/1989 | Fedele | 375/27 |
| 4,942,467 | 7/1990 | Waldman et al. | 358/135 |
| 4,990,910 | 2/1991 | Takishima | 341/79 |
| 5,046,121 | 9/1991 | Yonekawa et al. | 382/56 |
| 5,058,144 | 10/1991 | Fiala et al. | 375/122 |
| 5,187,755 | 2/1993 | Aragaki | 382/56 |
| 5,260,693 | 10/1993 | Horsley | 341/67 |

Primary Examiner—David K. Moore
Assistant Examiner—Matthew C. Bella
Attorney, Agent, or Firm—Blakely, Sokoloff, Taylor & Zafman

[57] ABSTRACT

A method and apparatus for quantizing a stream of data at a predetermined bit compression ratio. A binary decision tree is established for classifying the error between a predicted and actual data value. The binary decision tree comprising a root node and multiple binary nodes represented by a pair of threshold values around the root node, a member of each pair representing a node in the binary decision tree and a threshold value indicative of a range of data values. The range in which the data values lies is then determined and a binary code representing the quantized error (token) between the predicted and actual data values. The quantized error symbol (token) is then encoded and a bit string corresponding to the error symbol is output, thereby representing compressed data. After a predetermined number of errors have been quantized (and encoded), the bit rate of the compressed data is compared to a predetermined (target) compression ratio. The ranges used to quantize the error are then adjusted to maintain the predetermined compression ratio.

29 Claims, 17 Drawing Sheets

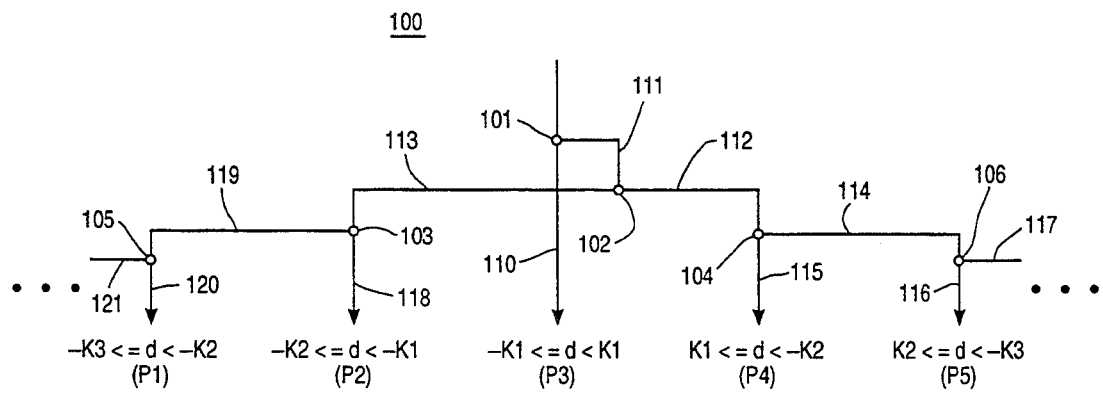
FIG_1
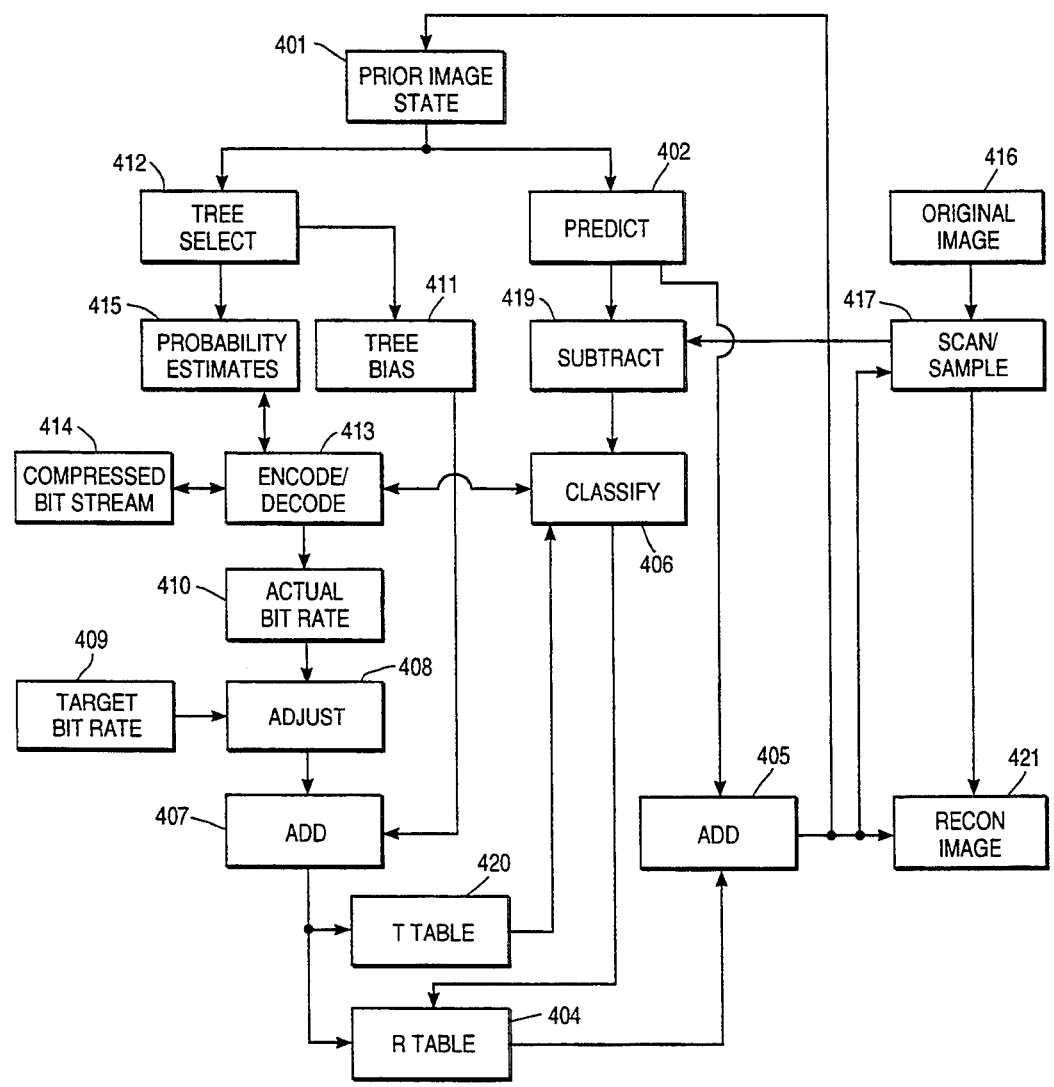
FIG_2

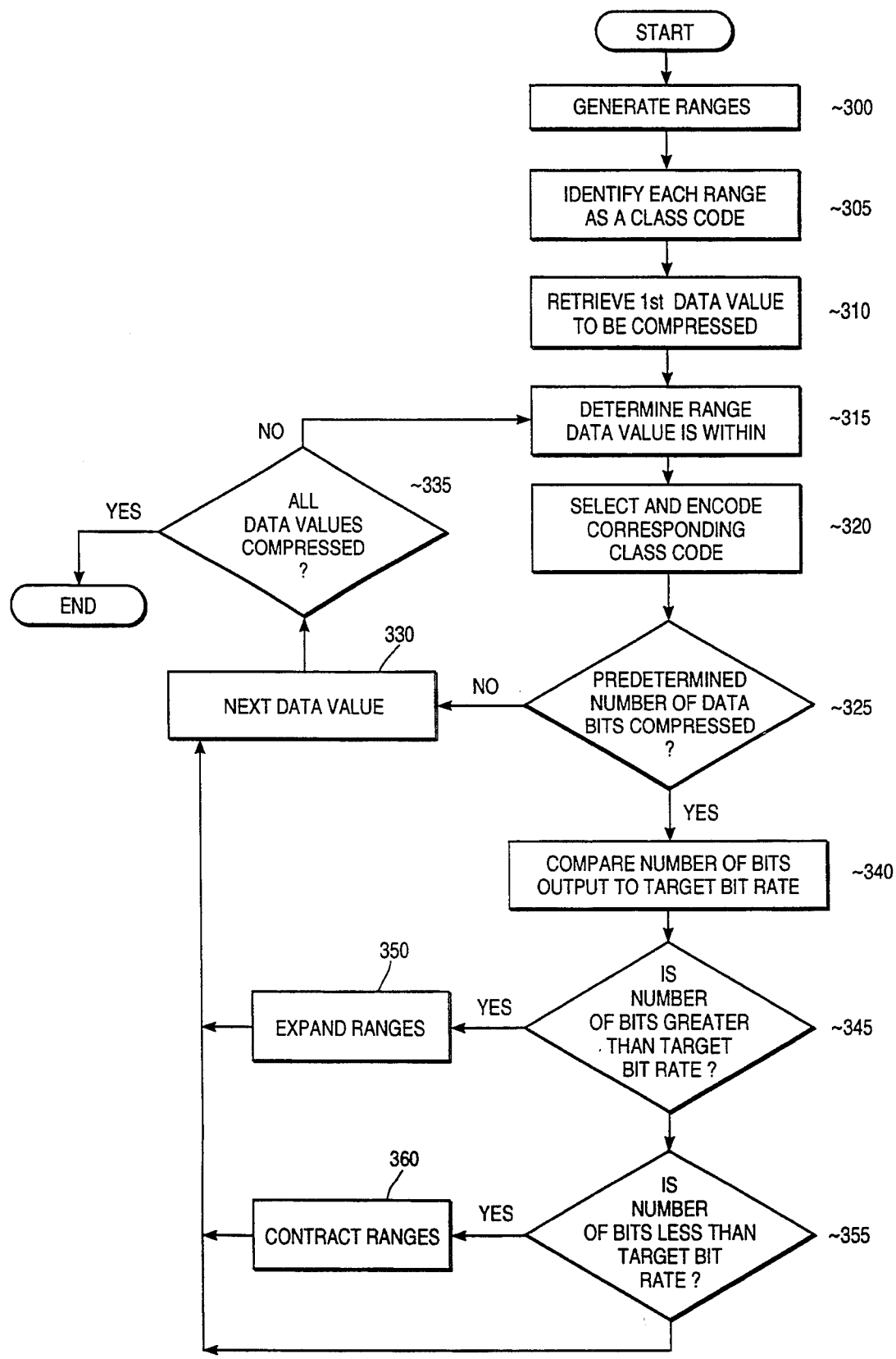
FIG_3

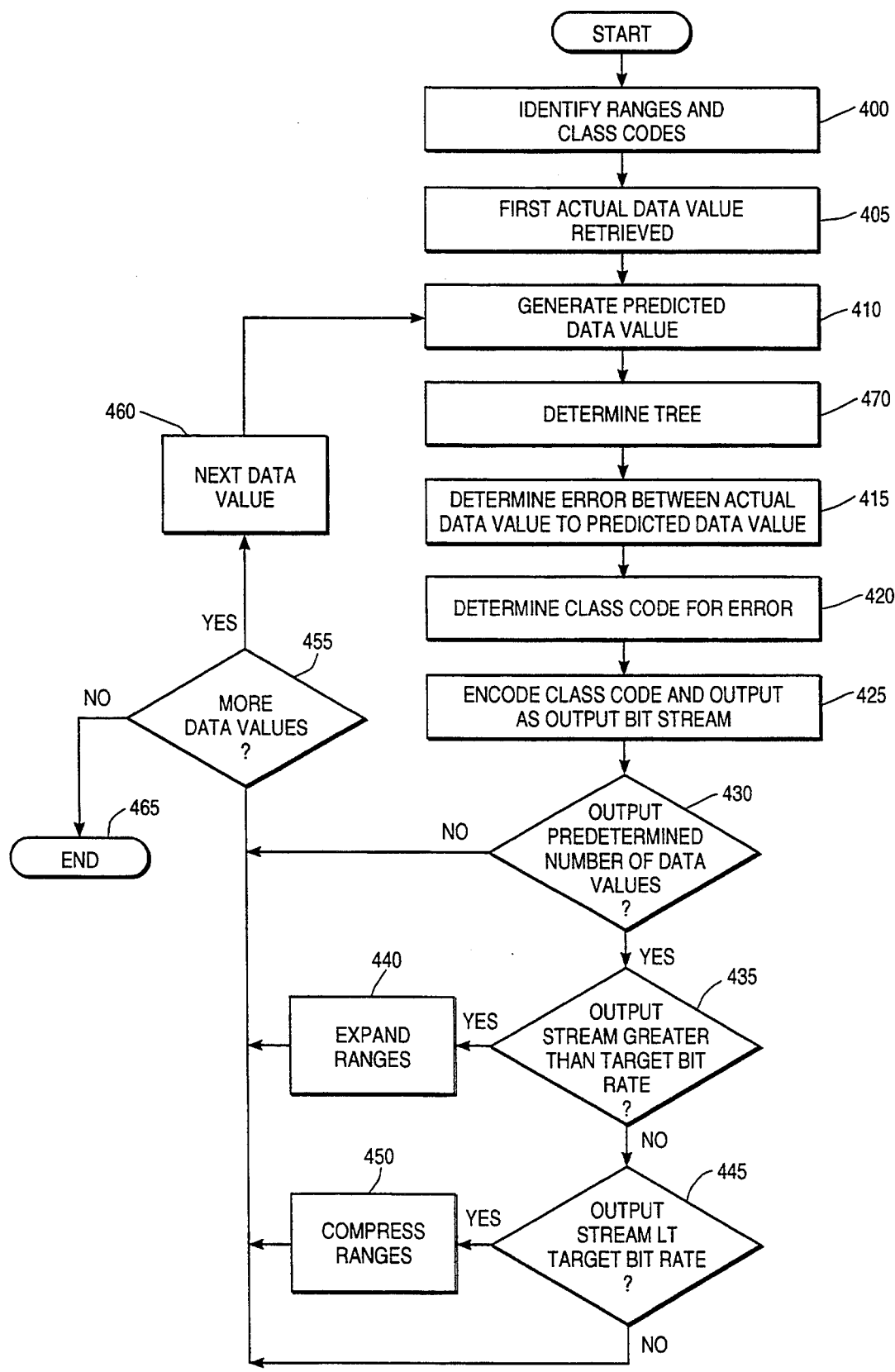
FIG_4A

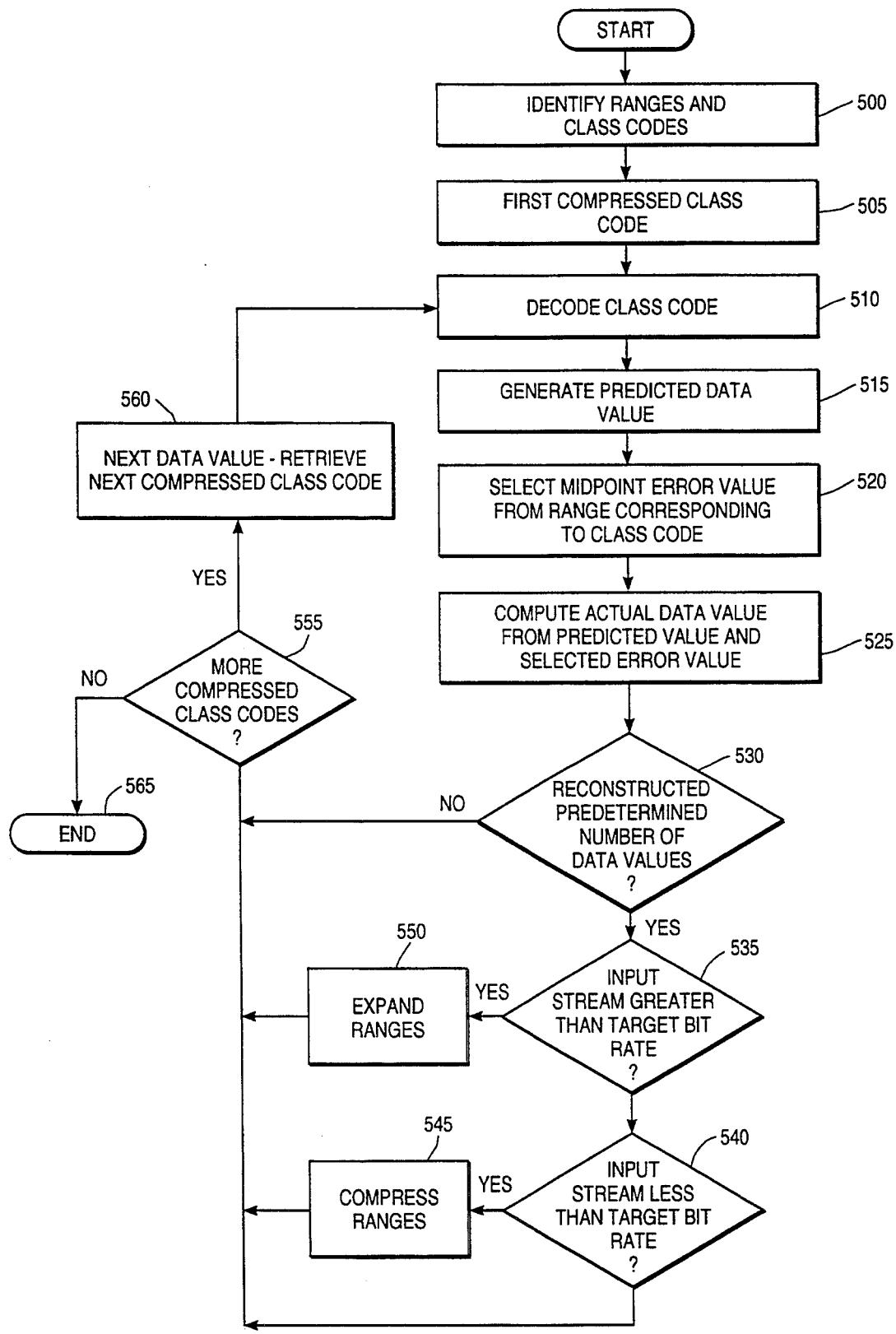
FIG_4B

| "T TABLE" | | | | | | | | | | | | | |
|---|---|---|---|---|---|---|---|---|---|---|---|---|---|
| 0) | 2 | 9 | 19 | 32 | 48 | 66 | 86 | 109 | 135 | 163 | 194 | 228 | 264 |
| 1) | 2 | 9 | 20 | 33 | 48 | 67 | 88 | 111 | 137 | 166 | 197 | 232 | 268 |
| 2) | 2 | 10 | 20 | 34 | 49 | 68 | 89 | 113 | 140 | 169 | 201 | 235 | 272 |
| 3) | 2 | 10 | 21 | 34 | 50 | 69 | 91 | 115 | 142 | 172 | 204 | 239 | 276 |
| 4) | 2 | 10 | 21 | 35 | 52 | 71 | 93 | 117 | 145 | 175 | 207 | 243 | 281 |
| 5) | 2 | 11 | 22 | 36 | 53 | 72 | 94 | 119 | 147 | 178 | 211 | 247 | 285 |
| 6) | 2 | 11 | 22 | 37 | 54 | 74 | 96 | 122 | 150 | 181 | 214 | 251 | 290 |
| 7) | 2 | 11 | 23 | 38 | 55 | 75 | 98 | 124 | 153 | 184 | 218 | 255 | 295 |
| 8) | 2 | 12 | 24 | 39 | 56 | 77 | 100 | 126 | 156 | 187 | 222 | 260 | |
| 9) | 2 | 12 | 24 | 39 | 58 | 79 | 102 | 129 | 158 | 191 | 226 | 264 | |
| 10) | 2 | 12 | 25 | 40 | 59 | 80 | 104 | 132 | 162 | 194 | 230 | 269 | |
| 11) | 3 | 13 | 26 | 41 | 60 | 82 | 107 | 134 | 165 | 198 | 234 | 274 | |
| 12) | 3 | 13 | 26 | 43 | 62 | 84 | 109 | 137 | 168 | 202 | 239 | 279 | |
| 13) | 3 | 13 | 27 | 44 | 63 | 86 | 111 | 140 | 171 | 206 | 244 | 284 | |
| 14) | 3 | 14 | 28 | 45 | 65 | 88 | 114 | 143 | 175 | 210 | 248 | 290 | |
| 15) | 3 | 14 | 29 | 46 | 66 | 90 | 116 | 146 | 179 | 214 | 253 | 295 | |
| 16) | 3 | 15 | 29 | 47 | 68 | 92 | 119 | 149 | 182 | 219 | 258 | | |
| 17) | 3 | 15 | 30 | 48 | 70 | 94 | 122 | 152 | 186 | 223 | 264 | | |
| 18) | 3 | 16 | 31 | 50 | 71 | 96 | 124 | 156 | 190 | 228 | 269 | | |
| 19) | 4 | 16 | 32 | 51 | 73 | 99 | 127 | 159 | 195 | 233 | 275 | | |
| 20) | 4 | 17 | 33 | 52 | 75 | 101 | 130 | 163 | 199 | 238 | 280 | | |
| 21) | 4 | 17 | 34 | 54 | 77 | 104 | 133 | 167 | 203 | 243 | 287 | | |
| 22) | 4 | 18 | 35 | 55 | 79 | 106 | 137 | 171 | 208 | 249 | 293 | | |
| 23) | 4 | 18 | 36 | 57 | 81 | 109 | 140 | 175 | 213 | 254 | 299 | | |
| 24) | 4 | 19 | 37 | 58 | 83 | 112 | 143 | 179 | 218 | 260 | | | |
| 25) | 5 | 20 | 38 | 60 | 85 | 114 | 147 | 183 | 223 | 266 | | | |
| 26) | 5 | 20 | 39 | 61 | 88 | 117 | 151 | 187 | 228 | 272 | | | |
| 27) | 5 | 21 | 40 | 63 | 90 | 120 | 154 | 192 | 233 | 278 | | | |
| 28) | 5 | 21 | 41 | 65 | 92 | 123 | 158 | 197 | 239 | 285 | | | |
| 29) | 5 | 22 | 43 | 67 | 95 | 127 | 162 | 202 | 245 | 292 | | | |
| 30) | 6 | 23 | 44 | 69 | 97 | 130 | 166 | 207 | 251 | 299 | | | |
| 31) | 6 | 24 | 45 | 71 | 100 | 134 | 171 | 212 | 257 | | | | |
| 32) | 6 | 24 | 47 | 73 | 103 | 137 | 175 | 217 | 263 | | | | |
| 33) | 6 | 25 | 48 | 75 | 106 | 141 | 180 | 223 | 270 | | | | |
| 34) | 7 | 26 | 49 | 77 | 109 | 144 | 184 | 228 | 277 | | | | |
| 35) | 7 | 27 | 51 | 79 | 112 | 148 | 189 | 234 | 284 | | | | |
| 36) | 7 | 28 | 52 | 81 | 115 | 152 | 194 | 240 | 291 | | | | |
| 37) | 7 | 28 | 54 | 84 | 118 | 157 | 199 | 247 | 298 | | | | |
| 38) | 8 | 29 | 56 | 86 | 121 | 161 | 205 | 253 | | | | | |
| 39) | 8 | 30 | 57 | 89 | 125 | 165 | 210 | 260 | | | | | |
| 40) | 8 | 31 | 59 | 91 | 128 | 170 | 216 | 267 | | | | | |
| 41) | 9 | 32 | 61 | 94 | 132 | 174 | 222 | 274 | | | | | |
| 42) | 9 | 33 | 63 | 97 | 136 | 179 | 228 | 281 | | | | | |
| 43) | 9 | 34 | 65 | 100 | 139 | 184 | 234 | 289 | | | | | |
| 44) | 9 | 35 | 66 | 102 | 143 | 189 | 240 | 296 | | | | | |
| 45) | 10 | 37 | 68 | 105 | 148 | 195 | 247 | | | | | | |
| 46) | 10 | 38 | 71 | 109 | 152 | 200 | 254 | | | | | | |
| 47) | 11 | 39 | 73 | 112 | 156 | 206 | 261 | | | | | | |
| 48) | 11 | 40 | 75 | 115 | 161 | 212 | 268 | | | | | | |
| 49) | 11 | 41 | 77 | 118 | 165 | 218 | 275 | | | | | | |
| 50) | 12 | 43 | 79 | 122 | 170 | 224 | 283 | | | | | | |
| 51) | 12 | 44 | 82 | 125 | 175 | 230 | 291 | | | | | | |
| 52) | 13 | 45 | 84 | 129 | 180 | 236 | 299 | | | | | | |

FIG_5A

| | | | | | | |
|---|---|---|---|---|---|---|
| 53) | 13 | 47 | 87 | 133 | 185 | 243 |
| 54) | 13 | 48 | 90 | 137 | 190 | 250 |
| 55) | 14 | 50 | 92 | 141 | 196 | 257 |
| 56) | 14 | 51 | 95 | 145 | 202 | 264 |
| 57) | 15 | 53 | 98 | 149 | 207 | 272 |
| 58) | 15 | 55 | 101 | 154 | 213 | 280 |
| 59) | 16 | 56 | 104 | 158 | 219 | 288 |
| 60) | 16 | 58 | 107 | 163 | 226 | 296 |
| 61) | 17 | 60 | 110 | 168 | 232 | |
| 62) | 17 | 62 | 113 | 173 | 239 | |
| 63) | 18 | 64 | 117 | 178 | 246 | |
| 64) | 19 | 66 | 120 | 183 | 253 | |
| 65) | 19 | 68 | 124 | 188 | 260 | |
| 66) | 20 | 70 | 127 | 193 | 268 | |
| 67) | 20 | 72 | 131 | 199 | 275 | |
| 68) | 21 | 74 | 135 | 205 | 283 | |
| 69) | 22 | 76 | 139 | 211 | 291 | |
| 70) | 23 | 78 | 143 | 217 | | |
| 71) | 23 | 81 | 148 | 223 | | |
| 72) | 24 | 83 | 152 | 230 | | |
| 73) | 25 | 86 | 156 | 236 | | |
| 74) | 25 | 88 | 161 | 243 | | |
| 75) | 26 | 91 | 165 | 250 | | |
| 76) | 27 | 93 | 170 | 257 | | |
| 77) | 28 | 96 | 175 | 264 | | |
| 78) | 29 | 99 | 180 | 272 | | |
| 79) | 30 | 102 | 185 | 280 | | |
| 80) | 31 | 105 | 191 | 288 | | |
| 81) | 31 | 108 | 196 | 296 | | |
| 82) | 32 | 111 | 202 | | | |
| 83) | 33 | 114 | 207 | | | |
| 84) | 34 | 118 | 213 | | | |
| 85) | 35 | 121 | 219 | | | |
| 86) | 36 | 124 | 226 | | | |
| 87) | 38 | 128 | 232 | | | |
| 88) | 39 | 132 | 238 | | | |
| 89) | 40 | 135 | 245 | | | |
| 90) | 41 | 139 | 252 | | | |
| 91) | 42 | 143 | 259 | | | |
| 92) | 43 | 147 | 266 | | | |
| 93) | 45 | 151 | 273 | | | |
| 94) | 46 | 155 | 281 | | | |
| 95) | 47 | 160 | 289 | | | |
| 96) | 49 | 164 | 297 | | | |
| 97) | 50 | 169 | | | | |
| 98) | 51 | 173 | | | | |
| 99) | 53 | 178 | | | | |
| 00) | 54 | 183 | | | | |
| 01) | 56 | 188 | | | | |
| 02) | 57 | 193 | | | | |
| 03) | 59 | 198 | | | | |
| 04) | 60 | 204 | | | | |
| 05) | 62 | 209 | | | | |
| 06) | 64 | 215 | | | | |
| 07) | 66 | 220 | | | | |
| 08) | 67 | 226 | | | | |
| 09) | 69 | 232 | | | | |
| 10) | 71 | 238 | | | | |
| 11) | 73 | 245 | | | | |
| 12) | 75 | 251 | | | | |

FIG_5B

| | | |
|---|---|---|
| 113) | 77 | 258 |
| 114) | 79 | 264 |
| 115) | 81 | 271 |
| 116) | 83 | 278 |
| 117) | 85 | 285 |
| 118) | 87 | 293 |
| 119) | 90 | |
| 120) | 92 | |
| 121) | 94 | |
| 122) | 97 | |
| 123) | 99 | |
| 124) | 102 | |
| 125) | 104 | |
| 126) | 107 | |
| 127) | 110 | |
| 128) | 112 | |
| 129) | 115 | |
| 130) | 118 | |
| 131) | 121 | |
| 132) | 124 | |
| 133) | 127 | |
| 134) | 130 | |
| 135) | 133 | |
| 136) | 137 | |
| 137) | 140 | |
| 138) | 143 | |
| 139) | 147 | |
| 140) | 150 | |
| 141) | 154 | |
| 142) | 157 | |
| 143) | 161 | |
| 144) | 165 | |
| 145) | 169 | |
| 146) | 173 | |
| 147) | 177 | |
| 148) | 181 | |
| 149) | 185 | |
| 150) | 189 | |
| 151) | 194 | |
| 152) | 198 | |

FIG_5C

| | | | |
|---|---|---|---|
| LINE 1: | 905 CUM BITS USED; | ACTRATE = 1.285511 | NET_T = 19 |
| LINE 2: | 2788 CUM BITS USED; | ACTRATE = 1.980114 | NET_T = 16 |
| LINE 3: | 4523 CUM BITS USED; | ACTRATE = 2.141572 | NET_T = 13 |
| LINE 4: | 6293 CUM BITS USED; | ACTRATE = 2.234730 | NET_T = 10 |
| LINE 5: | 7929 CUM BITS USED; | ACTRATE = 2.252557 | NET_T = 7 |
| LINE 6: | 9700 CUM BITS USED; | ACTRATE = 2.296402 | NET_T = 4 |
| LINE 7: | 11228 CUM BITS USED; | ACTRATE = 2.278409 | NET_T = 1 |
| LINE 8: | 13003 CUM BITS USED; | ACTRATE = 2.308771 | NET_T = 0 |
| LINE 9: | 14564 CUM BITS USED; | ACTRATE = 2.298611 | NET_T = 0 |
| LINE 10: | 16358 CUM BITS USED; | ACTRATE = 2.323580 | NET_T = 0 |
| LINE 11: | 17968 CUM BITS USED; | ACTRATE = 2.320248 | NET_T = 0 |
| LINE 12: | 19758 CUM BITS USED; | ACTRATE = 2.338778 | NET_T = 0 |
| LINE 13: | 21362 CUM BITS USED; | ACTRATE = 2.334135 | NET_T = 0 |
| LINE 14: | 23095 CUM BITS USED; | ACTRATE = 2.343243 | NET_T = 0 |
| LINE 15: | 24694 CUM BITS USED; | ACTRATE = 2.338447 | NET_T = 0 |
| LINE 16: | 26448 CUM BITS USED; | ACTRATE = 2.348011 | NET_T = 0 |

FIG_6A

```
LINE 17:    28104 CUM BITS USED;   ACTRATE = 2.348262  NET_T = 0
LINE 18:    29866 CUM BITS USED;   ACTRATE = 2.356850  NET_T = 0
LINE 19:    31421 CUM BITS USED;   ACTRATE = 2.349058  NET_T = 0
LINE 20:    33157 CUM BITS USED;   ACTRATE = 2.354901  NET_T = 0
LINE 21:    34704 CUM BITS USED;   ACTRATE = 2.347403  NET_T = 0
LINE 22:    36521 CUM BITS USED;   ACTRATE = 2.358019  NET_T = 0
LINE 23:    38125 CUM BITS USED;   ACTRATE = 2.354558  NET_T = 0
LINE 24:    39836 CUM BITS USED;   ACTRATE = 2.357718  NET_T = 0
LINE 25:    41419 CUM BITS USED;   ACTRATE = 2.353352  NET_T = 0
LINE 26:    43111 CUM BITS USED;   ACTRATE = 2.355278  NET_T = 0
LINE 27:    44751 CUM BITS USED;   ACTRATE = 2.354325  NET_T = 0
LINE 28     46450 CUM BITS USED;   ACTRATE = 2.356433  NET_T = 0
LINE 29:    48045 CUM BITS USED;   ACTRATE = 2.353301  NET_T = 0
LINE 30:    49783 CUM BITS USED;   ACTRATE = 2.357150  NET_T = 0
LINE 31:    51409 CUM BITS USED;   ACTRATE = 2.355618  NET_T = 0
LINE 32:    53157 CUM BITS USED;   ACTRATE = 2.359597  NET_T = 0
LINE 33:    54801 CUM BITS USED;   ACTRATE = 2.358859  NET_T = 0
LINE 34:    56551 CUM BITS USED;   ACTRATE = 2.362592  NET_T = 0
LINE 35:    58130 CUM BITS USED;   ACTRATE = 2.359172  NET_T = 0
LINE 36:    59873 CUM BITS USED;   ACTRATE = 2.362413  NET_T = 0
LINE 37:    61441 CUM BITS USED;   ACTRATE = 2.358761  NET_T = 0
LINE 38:    63169 CUM BITS USED;   ACTRATE = 2.361281  NET_T = 0
LINE 39:    64750 CUM BITS USED;   ACTRATE = 2.358319  NET_T = 0
LINE 40:    66458 CUM BITS USED;   ACTRATE = 2.360014  NET_T = 0
LINE 41:    68066 CUM BITS USED;   ACTRATE = 2.358162  NET_T = 0
LINE 42:    69864 CUM BITS USED;   ACTRATE = 2.362825  NET_T = 0
LINE 43:    71487 CUM BITS USED;   ACTRATE = 2.361489  NET_T = 0
LINE 44:    73396 CUM BITS USED;   ACTRATE = 2.369447  NET_T = 0
LINE 45:    75146 CUM BITS USED;   ACTRATE = 2.372003  NET_T = 0
LINE 46:    77102 CUM BITS USED;   ACTRATE = 2.380867  NET_T = 0
LINE 47:    78939 CUM BITS USED;   ACTRATE = 2.385729  NET_T = 0
LINE 48:    81033 CUM BITS USED;   ACTRATE = 2.397994  NET_T = 0
LINE 49:    83017 CUM BITS USED;   ACTRATE = 2.406569  NET_T = 0
LINE 50:    85143 CUM BITS USED;   ACTRATE = 2.418835  NET_T = 0
LINE 51:    87082 CUM BITS USED;   ACTRATE = 2.425412  NET_T = 0
LINE 52:    89140 CUM BITS USED;   ACTRATE = 2.434987  NET_T = 0
LINE 53:    91033 CUM BITS USED;   ACTRATE = 2.439778  NET_T = 0
LINE 54:    93197 CUM BITS USED;   ACTRATE = 2.451520  NET_T = 0
LINE 55:    95055 CUM BITS USED;   ACTRATE = 2.454933  NET_T = 0
LINE 56:    97075 CUM BITS USED;   ACTRATE = 2.462332  NET_T = 0
LINE 57:    98832 CUM BITS USED;   ACTRATE = 2.462919  NET_T = 0
LINE 58:   100853 CUM BITS USED;   ACTRATE = 2.469950  NET_T = 0
LINE 59:   102675 CUM BITS USED;   ACTRATE = 2.471952  NET_T = 0
LINE 60:   104669 CUM BITS USED;   ACTRATE = 2.477959  NET_T = 0
LINE 61:   106506 CUM BITS USED;   ACTRATE = 2.480114  NET_T = 0
LINE 62:   108559 CUM BITS USED;   ACTRATE = 2.487147  NET_T = 0
LINE 63:   110491 CUM BITS USED;   ACTRATE = 2.491229  NET_T = 0
LINE 64:   112568 CUM BITS USED;   ACTRATE = 2.498402  NET_T = 0
LINE 65:   114431 CUM BITS USED;   ACTRATE = 2.500677  NET_T = 0
LINE 66:   116497 CUM BITS USED;   ACTRATE = 2.507253  NET_T = 0
LINE 67:   118447 CUM BITS USED;   ACTRATE = 2.511173  NET_T = 0
LINE 68:   120536 CUM BITS USED;   ACTRATE = 2.517881  NET_T = 0
LINE 69:   122358 CUM BITS USED;   ACTRATE = 2.518898  NET_T = 0
LINE 70:   124461 CUM BITS USED;   ACTRATE = 2.525589  NET_T = 0
LINE 71:   126314 CUM BITS USED;   ACTRATE = 2.527089  NET_T = 0
LINE 72:   128409 CUM BITS USED;   ACTRATE = 2.533321  NET_T = 0
LINE 73:   130276 CUM BITS USED;   ACTRATE = 2.534947  NET_T = 0
LINE 74:   132386 CUM BITS USED;   ACTRATE = 2.541193  NET_T = 0
LINE 75:   134217 CUM BITS USED;   ACTRATE = 2.541989  NET_T = 0
LINE 76:   136304 CUM BITS USED;   ACTRATE = 2.547548  NET_T = 0
```

FIG_6B

```
LINE 77:   138256  CUM BITS USED;  ACTRATE = 2.550472  NET_T = 0
LINE 78:   140413  CUM BITS USED;  ACTRATE = 2.557055  NET_T = 0
LINE 79:   142411  CUM BITS USED;  ACTRATE = 2.560612  NET_T = 0
LINE 80:   144552  CUM BITS USED;  ACTRATE = 2.566619  NET_T = 0
LINE 81:   146578  CUM BITS USED;  ACTRATE = 2.570462  NET_T = 0
LINE 82:   148730  CUM BITS USED;  ACTRATE = 2.576393  NET_T = 0
LINE 83:   150669  CUM BITS USED;  ACTRATE = 2.578536  NET_T = 0
LINE 84:   152818  CUM BITS USED;  ACTRATE = 2.584179  NET_T = 0
LINE 85:   154767  CUM BITS USED;  ACTRATE = 2.586347  NET_T = 0
LINE 86:   156932  CUM BITS USED;  ACTRATE = 2.592032  NET_T = 0
LINE 87:   158912  CUM BITS USED;  ACTRATE = 2.594566  NET_T = 0
LINE 88    161075  CUM BITS USED;  ACTRATE = 2.599997  NET_T = 0
LINE 89:   163051  CUM BITS USED;  ACTRATE = 2.602321  NET_T = 0
LINE 90:   165264  CUM BITS USED;  ACTRATE = 2.608333  NET_T = 0
LINE 91:   167193  CUM BITS USED;  ACTRATE = 2.609781  NET_T = 0
LINE 92:   169425  CUM BITS USED;  ACTRATE = 2.615875  NET_T = 0
LINE 93:   171411  CUM BITS USED;  ACTRATE = 2.618081  NET_T = 0
LINE 94:   173681  CUM BITS USED;  ACTRATE = 2.624532  NET_T = 0
LINE 95:   175706  CUM BITS USED;  ACTRATE = 2.627183  NET_T = 0
LINE 96:   177891  CUM BITS USED;  ACTRATE = 2.632147  NET_T = 0
LINE 97:   179823  CUM BITS USED;  ACTRATE = 2.633303  NET_T = 0
LINE 98:   181914  CUM BITS USED;  ACTRATE = 2.636740  NET_T = 0
LINE 99:   183807  CUM BITS USED;  ACTRATE = 2.637268  NET_T = 0
LINE 100:  185860  CUM BITS USED;  ACTRATE = 2.640057  NET_T = 0
LINE 101:  187742  CUM BITS USED;  ACTRATE = 2.640386  NET_T = 0
LINE 102:  189899  CUM BITS USED;  ACTRATE = 2.644538  NET_T = 0
LINE 103:  191903  CUM BITS USED;  ACTRATE = 2.646500  NET_T = 0
LINE 104:  194068  CUM BITS USED;  ACTRATE = 2.650623  NET_T = 0
LINE 105:  195985  CUM BITS USED;  ACTRATE = 2.651312  NET_T = 0
LINE 106:  198116  CUM BITS USED;  ACTRATE = 2.654856  NET_T = 0
LINE 107:  199958  CUM BITS USED;  ACTRATE = 2.654498  NET_T = 0
LINE 108:  202040  CUM BITS USED;  ACTRATE = 2.657302  NET_T = 0
LINE 109:  203973  CUM BITS USED;  ACTRATE = 2.658113  NET_T = 0
LINE 110:  206055  CUM BITS USED;  ACTRATE = 2.660834  NET_T = 0
LINE 111:  208052  CUM BITS USED;  ACTRATE = 2.662418  NET_T = 0
LINE 112:  210242  CUM BITS USED;  ACTRATE = 2.666421  NET_T = 0
LINE 113:  212244  CUM BITS USED;  ACTRATE = 2.667991  NET_T = 0
LINE 114:  214386  CUM BITS USED;  ACTRATE = 2.671277  NET_T = 0
LINE 115:  216300  CUM BITS USED;  ACTRATE = 2.671690  NET_T = 0
LINE 116:  218356  CUM BITS USED;  ACTRATE = 2.673834  NET_T = 0
LINE 117:  220319  CUM BITS USED;  ACTRATE = 2.674813  NET_T = 0
LINE 118:  222489  CUM BITS USED;  ACTRATE = 2.678267  NET_T = 0
LINE 119:  224381  CUM BITS USED;  ACTRATE = 2.678345  NET_T = 0
LINE 120:  226438  CUM BITS USED;  ACTRATE = 2.680374  NET_T = 0
LINE 121:  228295  CUM BITS USED;  ACTRATE = 2.680022  NET_T = 0
LINE 122:  230345  CUM BITS USED;  ACTRATE = 2.681923  NET_T = 0
LINE 123:  232224  CUM BITS USED;  ACTRATE = 2.681818  NET_T = 0
LINE 124:  234300  CUM BITS USED;  ACTRATE = 2.683972  NET_T = 0
LINE 125:  236165  CUM BITS USED;  ACTRATE = 2.683693  NET_T = 0
LINE 126:  238364  CUM BITS USED;  ACTRATE = 2.687184  NET_T = 0
LINE 127:  240395  CUM BITS USED;  ACTRATE = 2.688741  NET_T = 0
LINE 128:  242608  CUM BITS USED;  ACTRATE = 2.692294  NET_T = 0
LINE 129:  244591  CUM BITS USED;  ACTRATE = 2.693259  NET_T = 0
LINE 130:  246752  CUM BITS USED;  ACTRATE = 2.696154  NET_T = 0
LINE 131:  248726  CUM BITS USED;  ACTRATE = 2.696977  NET_T = 0
LINE 132:  250921  CUM BITS USED;  ACTRATE = 2.700166  NET_T = 0
LINE 133:  252884  CUM BITS USED;  ACTRATE = 2.700829  NET_T = 0
LINE 134:  255041  CUM BITS USED;  ACTRATE = 2.703538  NET_T = 0
LINE 135:  257018  CUM BITS USED;  ACTRATE = 2.704314  NET_T = 0
LINE 136:  259129  CUM BITS USED;  ACTRATE = 2.706478  NET_T = 0
```

FIG_6C

```
LINE 137:  260992  CUM BITS USED;  ACTRATE = 2.706038  NET_T = 0
LINE 138:  263049  CUM BITS USED;  ACTRATE = 2.707603  NET_T = 0
LINE 139:  264962  CUM BITS USED;  ACTRATE = 2.707673  NET_T = 0
LINE 140:  267096  CUM BITS USED;  ACTRATE = 2.709984  NET_T = 0
LINE 141:  269008  CUM BITS USED;  ACTRATE = 2.710026  NET_T = 0
LINE 142:  271168  CUM BITS USED;  ACTRATE = 2.712548  NET_T = 0
LINE 143:  273095  CUM BITS USED;  ACTRATE = 2.712721  NET_T = 0
LINE 144:  275234  CUM BITS USED;  ACTRATE = 2.714982  NET_T = 0
LINE 145:  277274  CUM BITS USED;  ACTRATE = 2.716242  NET_T = 0
LINE 146:  279478  CUM BITS USED;  ACTRATE = 2.719081  NET_T = 0
LINE 147:  281400  CUM BITS USED;  ACTRATE = 2.719156  NET_T = 0
LINE 148   283505  CUM BITS USED;  ACTRATE = 2.720986  NET_T = 0
LINE 149:  285579  CUM BITS USED;  ACTRATE = 2.722497  NET_T = 0
LINE 150:  287800  CUM BITS USED;  ACTRATE = 2.725379  NET_T = 0
LINE 151:  289870  CUM BITS USED;  ACTRATE = 2.726802  NET_T = 0
LINE 152:  292134  CUM BITS USED;  ACTRATE = 2.730020  NET_T = 0
LINE 153:  294229  CUM BITS USED;  ACTRATE = 2.731627  NET_T = 0
LINE 154:  296373  CUM BITS USED;  ACTRATE = 2.733665  NET_T = 0
LINE 155:  298412  CUM BITS USED;  ACTRATE = 2.734714  NET_T = 0
LINE 156:  300621  CUM BITS USED;  ACTRATE = 2.737298  NET_T = 0
LINE 157:  302650  CUM BITS USED;  ACTRATE = 2.738220  NET_T = 0
LINE 158:  304917  CUM BITS USED;  ACTRATE = 2.741271  NET_T = 0
LINE 159:  306997  CUM BITS USED;  ACTRATE = 2.742612  NET_T = 0
LINE 160:  309288  CUM BITS USED;  ACTRATE = 2.745810  NET_T = 1
LINE 161:  311295  CUM BITS USED;  ACTRATE = 2.746462  NET_T = 1
LINE 162:  313488  CUM BITS USED;  ACTRATE = 2.748737  NET_T = 1
LINE 163:  315450  CUM BITS USED;  ACTRATE = 2.748972  NET_T = 0
LINE 164:  317697  CUM BITS USED;  ACTRATE = 2.751672  NET_T = 0
LINE 165:  319757  CUM BITS USED;  ACTRATE = 2.752729  NET_T = 0
LINE 166:  322019  CUM BITS USED;  ACTRATE = 2.755502  NET_T = 0
LINE 167:  324071  CUM BITS USED;  ACTRATE = 2.756456  NET_T = 0
LINE 168:  326250  CUM BITS USED;  ACTRATE = 2.758472  NET_T = 0
LINE 169:  328187  CUM BITS USED;  ACTRATE = 2.758430  NET_T = 0
LINE 170:  330422  CUM BITS USED;  ACTRATE = 2.760879  NET_T = 0
LINE 171:  332438  CUM BITS USED;  ACTRATE = 2.761480  NET_T = 0
LINE 172:  334610  CUM BITS USED;  ACTRATE = 2.763362  NET_T = 0
LINE 173:  336542  CUM BITS USED;  ACTRATE = 2.763252  NET_T = 0
LINE 174:  338735  CUM BITS USED;  ACTRATE = 2.765274  NET_T = 0
LINE 175:  340689  CUM BITS USED;  ACTRATE = 2.765333  NET_T = 0
LINE 176:  342934  CUM BITS USED;  ACTRATE = 2.767740  NET_T = 0
LINE 177:  344935  CUM BITS USED;  ACTRATE = 2.768161  NET_T = 0
LINE 178:  347213  CUM BITS USED;  ACTRATE = 2.770788  NET_T = 0
LINE 179:  349260  CUM BITS USED;  ACTRATE = 2.771553  NET_T = 0
LINE 180:  351570  CUM BITS USED;  ACTRATE = 2.774384  NET_T = 1
LINE 181:  353665  CUM BITS USED;  ACTRATE = 2.775497  NET_T = 1
LINE 182:  355829  CUM BITS USED;  ACTRATE = 2.777137  NET_T = 1
LINE 183:  357840  CUM BITS USED;  ACTRATE = 2.777571  NET_T = 0
LINE 184:  359964  CUM BITS USED;  ACTRATE = 2.778872  NET_T = 0
LINE 185:  361929  CUM BITS USED;  ACTRATE = 2.778939  NET_T = 0
LINE 186:  364028  CUM BITS USED;  ACTRATE = 2.780028  NET_T = 0
LINE 187:  365898  CUM BITS USED;  ACTRATE = 2.779366  NET_T = 0
LINE 188:  368059  CUM BITS USED;  ACTRATE = 2.780910  NET_T = 0
LINE 189:  370049  CUM BITS USED;  ACTRATE = 2.781152  NET_T = 0
LINE 190:  372239  CUM BITS USED;  ACTRATE = 2.782887  NET_T = 0
LINE 191:  374255  CUM BITS USED;  ACTRATE = 2.783310  NET_T = 0
LINE 192:  376519  CUM BITS USED;  ACTRATE = 2.785563  NET_T = 0
LINE 193:  378468  CUM BITS USED;  ACTRATE = 2.785475  NET_T = 0
LINE 194:  380637  CUM BITS USED;  ACTRATE = 2.786998  NET_T = 0
LINE 195:  382601  CUM BITS USED;  ACTRATE = 2.787012  NET_T = 0
LINE 196:  384812  CUM BITS USED;  ACTRATE = 2.788816  NET_T = 0
```

FIG_6D

```
LINE 197:  386868 CUM BITS USED;  ACTRATE = 2.789484  NET_T = 0
LINE 198:  389084 CUM BITS USED;  ACTRATE = 2.791294  NET_T = 0
LINE 199:  391125 CUM BITS USED;  ACTRATE = 2.791836  NET_T = 0
LINE 200:  393341 CUM BITS USED;  ACTRATE = 2.793615  NET_T = 0
LINE 201:  395305 CUM BITS USED;  ACTRATE = 2.793596  NET_T = 0
LINE 202:  397546 CUM BITS USED;  ACTRATE = 2.795525  NET_T = 0
LINE 203:  399670 CUM BITS USED;  ACTRATE = 2.796616  NET_T = 0
LINE 204:  401940 CUM BITS USED;  ACTRATE = 2.798713  NET_T = 0
LINE 205:  403908 CUM BITS USED;  ACTRATE = 2.798697  NET_T = 0
LINE 206:  406109 CUM BITS USED;  ACTRATE = 2.800288  NET_T = 0
LINE 207:  408122 CUM BITS USED;  ACTRATE = 2.800574  NET_T = 0
LINE 208   410266 CUM BITS USED;  ACTRATE = 2.801751  NET_T = 0
LINE 209:  412241 CUM BITS USED;  ACTRATE = 2.801769  NET_T = 0
LINE 210:  414549 CUM BITS USED;  ACTRATE = 2.804038  NET_T = 0
LINE 211:  416555 CUM BITS USED;  ACTRATE = 2.804253  NET_T = 0
LINE 212:  418698 CUM BITS USED;  ACTRATE = 2.805384  NET_T = 0
LINE 213:  420809 CUM BITS USED;  ACTRATE = 2.806291  NET_T = 0
LINE 214:  423243 CUM BITS USED;  ACTRATE = 2.809334  NET_T = 1
LINE 215:  425379 CUM BITS USED;  ACTRATE = 2.810379  NET_T = 1
LINE 216:  427668 CUM BITS USED;  ACTRATE = 2.812421  NET_T = 2
LINE 217:  429855 CUM BITS USED;  ACTRATE = 2.813776  NET_T = 2
LINE 218:  423180 CUM BITS USED;  ACTRATE = 2.816019  NET_T = 2
LINE 219:  434307 CUM BITS USED;  ACTRATE = 2.816956  NET_T = 2
LINE 220:  436658 CUM BITS USED;  ACTRATE = 2.819331  NET_T = 3
LINE 221:  438900 CUM BITS USED;  ACTRATE = 2.820984  NET_T = 3
LINE 222:  441232 CUM BITS USED;  ACTRATE = 2.823198  NET_T = 4
LINE 223:  443414 CUM BITS USED;  ACTRATE = 2.824437  NET_T = 4
LINE 224:  445851 CUM BITS USED;  ACTRATE = 2.827282  NET_T = 5
LINE 225:  448075 CUM BITS USED;  ACTRATE = 2.828756  NET_T = 5
LINE 226:  450369 CUM BITS USED;  ACTRATE = 2.830658  NET_T = 5
LINE 227:  452537 CUM BITS USED;  ACTRATE = 2.831754  NET_T = 5
LINE 228:  454871 CUM BITS USED;  ACTRATE = 2.833875  NET_T = 6
LINE 229:  456979 CUM BITS USED;  ACTRATE = 2.834576  NET_T = 6
LINE 230:  459196 CUM BITS USED;  ACTRATE = 2.835944  NET_T = 6
LINE 231:  461258 CUM BITS USED;  ACTRATE = 2.836346  NET_T = 6
LINE 232:  463411 CUM BITS USED;  ACTRATE = 2.837303  NET_T = 5
LINE 233:  465430 CUM BITS USED;  ACTRATE = 2.837434  NET_T = 4
LINE 234:  467564 CUM BITS USED;  ACTRATE = 2.838262  NET_T = 4
LINE 235:  469577 CUM BITS USED;  ACTRATE = 2.838352  NET_T = 3
LINE 236:  471670 CUM BITS USED;  ACTRATE = 2.838923  NET_T = 2
LINE 237:  473534 CUM BITS USED;  ACTRATE = 2.838116  NET_T = 1
LINE 238:  475670 CUM BITS USED;  ACTRATE = 2.838940  NET_T = 0
LINE 239:  477736 CUM BITS USED;  ACTRATE = 2.839340  NET_T = 0
LINE 240:  479832 CUM BITS USED;  ACTRATE = 2.839915  NET_T = 0
LINE 241:  481824 CUM BITS USED;  ACTRATE = 2.839872  NET_T = 0
LINE 242:  483941 CUM BITS USED;  ACTRATE = 2.840563  NET_T = 0
LINE 243:  485905 CUM BITS USED;  ACTRATE = 2.840354  NET_T = 0
LINE 244:  488027 CUM BITS USED;  ACTRATE = 2.841066  NET_T = 0
LINE 245:  490132 CUM BITS USED;  ACTRATE = 2.841674  NET_T = 0
LINE 246:  492405 CUM BITS USED;  ACTRATE = 2.843248  NET_T = 0
LINE 247:  494415 CUM BITS USED;  ACTRATE = 2.843296  NET_T = 0
LINE 248:  496696 CUM BITS USED;  ACTRATE = 2.844896  NET_T = 0
LINE 249:  498835 CUM BITS USED;  ACTRATE = 2.845672  NET_T = 0
LINE 250:  501115 CUM BITS USED;  ACTRATE = 2.847244  NET_T = 0
LINE 251:  503238 CUM BITS USED;  ACTRATE = 2.847915  NET_T = 0
LINE 252:  505563 CUM BITS USED;  ACTRATE = 2.849719  NET_T = 1
LINE 253:  507853 CUM BITS USED;  ACTRATE = 2.851313  NET_T = 1
LINE 254:  510328 CUM BITS USED;  ACTRATE = 2.853928  NET_T = 2
LINE 255:  512573 CUM BITS USED;  ACTRATE = 2.855242  NET_T = 2
LINE 256:  515012 CUM BITS USED;  ACTRATE = 2.857622  NET_T = 3
```

FIG_6E

```
LINE 257:  517207  CUM BITS USED;  ACTRATE = 2.858634  NET_T = 3
LINE 258:  519572  CUM BITS USED;  ACTRATE = 2.860575  NET_T = 4
LINE 259:  521673  CUM BITS USED;  ACTRATE = 2.861053  NET_T = 4
LINE 260:  523786  CUM BITS USED;  ACTRATE = 2.861593  NET_T = 3
LINE 261:  525866  CUM BITS USED;  ACTRATE = 2.861949  NET_T = 3
LINE 262:  528134  CUM BITS USED;  ACTRATE = 2.863322  NET_T = 3
LINE 263:  530186  CUM BITS USED;  ACTRATE = 2.863518  NET_T = 3
LINE 264:  532432  CUM BITS USED;  ACTRATE = 2.864755  NET_T = 3
LINE 265:  534510  CUM BITS USED;  ACTRATE = 2.865084  NET_T = 3
LINE 266:  536855  CUM BITS USED;  ACTRATE = 2.866835  NET_T = 3
LINE 267:  538944  CUM BITS USED;  ACTRATE = 2.867211  NET_T = 3
LINE 268   541221  CUM BITS USED;  ACTRATE = 2.868582  NET_T = 4
LINE 269:  543267  CUM BITS USED;  ACTRATE = 2.868721  NET_T = 4
LINE 270:  545568  CUM BITS USED;  ACTRATE = 2.870202  NET_T = 4
LINE 271:  547656  CUM BITS USED;  ACTRATE = 2.870555  NET_T = 4
LINE 272:  549936  CUM BITS USED;  ACTRATE = 2.871908  NET_T = 5
LINE 273:  552105  CUM BITS USED;  ACTRATE = 2.872674  NET_T = 5
LINE 274:  554511  CUM BITS USED;  ACTRATE = 2.874663  NET_T = 6
LINE 275:  556703  CUM BITS USED;  ACTRATE = 2.875532  NET_T = 6
LINE 276:  559094  CUM BITS USED;  ACTRATE = 2.877419  NET_T = 7
LINE 277:  561425  CUM BITS USED;  ACTRATE = 2.878984  NET_T = 8
LINE 278:  563875  CUM BITS USED;  ACTRATE = 2.881147  NET_T = 9
LINE 279:  566159  CUM BITS USED;  ACTRATE = 2.882448  NET_T = 10
LINE 280:  568514  CUM BITS USED;  ACTRATE = 2.884101  NET_T = 11
LINE 281:  570876  CUM BITS USED;  ACTRATE = 2.885777  NET_T = 12
LINE 282:  573434  CUM BITS USED;  ACTRATE = 2.888429  NET_T = 13
LINE 283:  575724  CUM BITS USED;  ACTRATE = 2.889717  NET_T = 14
LINE 284:  578304  CUM BITS USED;  ACTRATE = 2.892446  NET_T = 15
LINE 285:  580667  CUM BITS USED;  ACTRATE = 2.894074  NET_T = 16
LINE 286:  583178  CUM BITS USED;  ACTRATE = 2.896426  NET_T = 17
LINE 287:  585489  CUM BITS USED;  ACTRATE = 2.897772  NET_T = 18
LINE 288:  588053  CUM BITS USED;  ACTRATE = 2.900356  NET_T = 19
LINE 289:  590431  CUM BITS USED;  ACTRATE = 2.902008  NET_T = 20
LINE 290:  593083  CUM BITS USED;  ACTRATE = 2.904991  NET_T = 21
LINE 291:  595454  CUM BITS USED;  ACTRATE = 2.906582  NET_T = 22
LINE 292:  598070  CUM BITS USED;  ACTRATE = 2.909353  NET_T = 23
LINE 293:  600477  CUM BITS USED;  ACTRATE = 2.911093  NET_T = 24
LINE 294:  603024  CUM BITS USED;  ACTRATE = 2.913497  NET_T = 25
LINE 295:  605389  CUM BITS USED;  ACTRATE = 2.915009  NET_T = 26
LINE 296:  607907  CUM BITS USED;  ACTRATE = 2.917244  NET_T = 27
LINE 297:  610211  CUM BITS USED;  ACTRATE = 2.918441  NET_T = 28
LINE 298:  612683  CUM BITS USED;  ACTRATE = 2.920426  NET_T = 29
LINE 299:  614961  CUM BITS USED;  ACTRATE = 2.921485  NET_T = 30
LINE 300:  617408  CUM BITS USED;  ACTRATE = 2.923333  NET_T = 31
LINE 301:  619597  CUM BITS USED;  ACTRATE = 2.923951  NET_T = 31
LINE 302:  621992  CUM BITS USED;  ACTRATE = 2.925534  NET_T = 32
LINE 303:  624168  CUM BITS USED;  ACTRATE = 2.926080  NET_T = 32
LINE 304:  626518  CUM BITS USED;  ACTRATE = 2.927435  NET_T = 33
LINE 305:  628595  CUM BITS USED;  ACTRATE = 2.927510  NET_T = 33
LINE 306:  630874  CUM BITS USED;  ACTRATE = 2.928522  NET_T = 33
LINE 307:  633004  CUM BITS USED;  ACTRATE = 2.928838  NET_T = 33
LINE 308:  635378  CUM BITS USED;  ACTRATE = 2.930278  NET_T = 34
LINE 309:  637555  CUM BITS USED;  ACTRATE = 2.930802  NET_T = 34
LINE 310:  639817  CUM BITS USED;  ACTRATE = 2.931713  NET_T = 34
LINE 311:  641883  CUM BITS USED;  ACTRATE = 2.931722  NET_T = 34
LINE 312:  644106  CUM BITS USED;  ACTRATE = 2.932446  NET_T = 34
LINE 313:  646201  CUM BITS USED;  ACTRATE = 2.932585  NET_T = 34
LINE 314:  648438  CUM BITS USED;  ACTRATE = 2.933365  NET_T = 34
LINE 315:  650490  CUM BITS USED;  ACTRATE = 2.933306  NET_T = 34
LINE 316:  652716  CUM BITS USED;  ACTRATE = 2.934030  NET_T = 34
```

FIG_6F

```
LINE 317:  654843  CUM BITS USED;  ACTRATE = 2.934305  NET_T = 34
LINE 318:  657184  CUM BITS USED;  ACTRATE = 2.935534  NET_T = 35
LINE 319:  659283  CUM BITS USED;  ACTRATE = 2.935679  NET_T = 35
LINE 320:  661549  CUM BITS USED;  ACTRATE = 2.936563  NET_T = 36
LINE 321:  663643  CUM BITS USED;  ACTRATE = 2.936681  NET_T = 36
LINE 322:  665926  CUM BITS USED;  ACTRATE = 2.937632  NET_T = 36
LINE 323:  667964  CUM BITS USED;  ACTRATE = 2.937500  NET_T = 36
LINE 324:  670367  CUM BITS USED;  ACTRATE = 2.938969  NET_T = 37
LINE 325:  672452  CUM BITS USED;  ACTRATE = 2.939039  NET_T = 37
LINE 326:  674626  CUM BITS USED;  ACTRATE = 2.939496  NET_T = 37
LINE 327:  676648  CUM BITS USED;  ACTRATE = 2.939290  NET_T = 37
LINE 328   678848  CUM BITS USED;  ACTRATE = 2.939856  NET_T = 37
LINE 329:  680826  CUM BITS USED;  ACTRATE = 2.939460  NET_T = 36
LINE 330:  683040  CUM BITS USED;  ACTRATE = 2.940083  NET_T = 36
LINE 331:  685223  CUM BITS USED;  ACTRATE = 2.940568  NET_T = 36
LINE 332:  687542  CUM BITS USED;  ACTRATE = 2.941633  NET_T = 37
LINE 333:  689673  CUM BITS USED;  ACTRATE = 2.941889  NET_T = 37
LINE 334:  691854  CUM BITS USED;  ACTRATE = 2.942357  NET_T = 37
LINE 335:  693948  CUM BITS USED;  ACTRATE = 2.942452  NET_T = 37
LINE 336:  696100  CUM BITS USED;  ACTRATE = 2.942793  NET_T = 37
LINE 337:  698146  CUM BITS USED;  ACTRATE = 2.942684  NET_T = 37
LINE 338:  700343  CUM BITS USED;  ACTRATE = 2.943211  NET_T = 37
LINE 339:  702508  CUM BITS USED;  ACTRATE = 2.943601  NET_T = 37
LINE 340:  704658  CUM BITS USED;  ACTRATE = 2.943925  NET_T = 37
LINE 341:  706735  CUM BITS USED;  ACTRATE = 2.943944  NET_T = 37
LINE 342:  709022  CUM BITS USED;  ACTRATE = 2.944835  NET_T = 37
LINE 343:  711091  CUM BITS USED;  ACTRATE = 2.944818  NET_T = 37
LINE 344:  713362  CUM BITS USED;  ACTRATE = 2.945635  NET_T = 38
LINE 345:  715399  CUM BITS USED;  ACTRATE = 2.945483  NET_T = 38
LINE 346:  717640  CUM BITS USED;  ACTRATE = 2.946171  NET_T = 38
LINE 347:  719629  CUM BITS USED;  ACTRATE = 2.945822  NET_T = 37
LINE 348:  721793  CUM BITS USED;  ACTRATE = 2.946190  NET_T = 37
LINE 349:  723727  CUM BITS USED;  ACTRATE = 2.945620  NET_T = 36
LINE 350:  725825  CUM BITS USED;  ACTRATE = 2.945718  NET_T = 36
LINE 351:  727800  CUM BITS USED;  ACTRATE = 2.945318  NET_T = 35
LINE 352:  730021  CUM BITS USED;  ACTRATE = 2.945914  NET_T = 35
LINE 353:  732180  CUM BITS USED;  ACTRATE = 2.946256  NET_T = 35
LINE 354:  734375  CUM BITS USED;  ACTRATE = 2.946741  NET_T = 35
LINE 355:  736347  CUM BITS USED;  ACTRATE = 2.946331  NET_T = 34
LINE 356:  738534  CUM BITS USED;  ACTRATE = 2.946781  NET_T = 34
LINE 357:  740558  CUM BITS USED;  ACTRATE = 2.946580  NET_T = 33
LINE 358:  742707  CUM BITS USED;  ACTRATE = 2.946876  NET_T = 33
LINE 359:  744719  CUM BITS USED;  ACTRATE = 2.946628  NET_T = 32
LINE 360:  746986  CUM BITS USED;  ACTRATE = 2.947388  NET_T = 32
LINE 361:  748967  CUM BITS USED;  ACTRATE = 2.947018  NET_T = 31
LINE 362:  751141  CUM BITS USED;  ACTRATE = 2.947408  NET_T = 31
LINE 363:  753124  CUM BITS USED;  ACTRATE = 2.947048  NET_T = 30
LINE 364:  755292  CUM BITS USED;  ACTRATE = 2.947412  NET_T = 29
LINE 365:  757345  CUM BITS USED;  ACTRATE = 2.947326  NET_T = 29
LINE 366:  759625  CUM BITS USED;  ACTRATE = 2.948122  NET_T = 29
LINE 367:  761836  CUM BITS USED;  ACTRATE = 2.948647  NET_T = 29
LINE 368:  764096  CUM BITS USED;  ACTRATE = 2.949358  NET_T = 30
LINE 369:  766152  CUM BITS USED;  ACTRATE = 2.949279  NET_T = 30
LINE 370:  768388  CUM BITS USED;  ACTRATE = 2.949893  NET_T = 30
LINE 371:  770471  CUM BITS USED;  ACTRATE = 2.949917  NET_T = 30
LINE 372:  772645  CUM BITS USED;  ACTRATE = 2.950288  NET_T = 30
LINE 373:  774823  CUM BITS USED;  ACTRATE = 2.950673  NET_T = 30
LINE 374:  777166  CUM BITS USED;  ACTRATE = 2.951682  NET_T = 31
LINE 375:  779395  CUM BITS USED;  ACTRATE = 2.952254  NET_T = 31
LINE 376:  781861  CUM BITS USED;  ACTRATE = 2.953718  NET_T = 32
```

FIG_6G

```
LINE 377:  784160  CUM BITS USED;  ACTRATE = 2.954545  NET_T = 33
LINE 378:  786532  CUM BITS USED;  ACTRATE = 2.955643  NET_T = 34
LINE 379:  788714  CUM BITS USED;  ACTRATE = 2.956022  NET_T = 34
LINE 380:  791074  CUM BITS USED;  ACTRATE = 2.957065  NET_T = 35
LINE 381:  793335  CUM BITS USED;  ACTRATE = 2.957733  NET_T = 36
LINE 382:  795612  CUM BITS USED;  ACTRATE = 2.958457  NET_T = 36
LINE 383:  797784  CUM BITS USED;  ACTRATE = 2.958788  NET_T = 36
LINE 384:  800144  CUM BITS USED;  ACTRATE = 2.959813  NET_T = 37
LINE 385:  802226  CUM BITS USED;  ACTRATE = 2.959807  NET_T = 37
LINE 386:  804476  CUM BITS USED;  ACTRATE = 2.960419  NET_T = 37
LINE 387:  806468  CUM BITS USED;  ACTRATE = 2.960080  NET_T = 37
LINE 388   808629  CUM BITS USED;  ACTRATE = 2.960363  NET_T = 37
LINE 389:  810563  CUM BITS USED;  ACTRATE = 2.959815  NET_T = 36
LINE 390:  812599  CUM BITS USED;  ACTRATE = 2.959641  NET_T = 35
LINE 391:  814621  CUM BITS USED;  ACTRATE = 2.959417  NET_T = 34
LINE 392:  816766  CUM BITS USED;  ACTRATE = 2.959640  NET_T = 33
LINE 393:  818878  CUM BITS USED;  ACTRATE = 2.959743  NET_T = 33
LINE 394:  821172  CUM BITS USED;  ACTRATE = 2.960501  NET_T = 33
LINE 395:  823349  CUM BITS USED;  ACTRATE = 2.960835  NET_T = 33
LINE 396:  825712  CUM BITS USED;  ACTRATE = 2.961834  NET_T = 34
LINE 397:  827926  CUM BITS USED;  ACTRATE = 2.962295  NET_T = 34
LINE 398:  830276  CUM BITS USED;  ACTRATE = 2.963239  NET_T = 35
LINE 399:  832417  CUM BITS USED;  ACTRATE = 2.963435  NET_T = 35
LINE 400:  834730  CUM BITS USED;  ACTRATE = 2.964240  NET_T = 36
LINE 401:  836841  CUM BITS USED;  ACTRATE = 2.964326  NET_T = 36
LINE 402:  839179  CUM BITS USED;  ACTRATE = 2.965213  NET_T = 37
LINE 403:  841221  CUM BITS USED;  ACTRATE = 2.965053  NET_T = 37
LINE 404:  843465  CUM BITS USED;  ACTRATE = 2.965603  NET_T = 37
LINE 405:  845544  CUM BITS USED;  ACTRATE = 2.965572  NET_T = 37
LINE 406:  847705  CUM BITS USED;  ACTRATE = 2.965829  NET_T = 37
LINE 407:  849628  CUM BITS USED;  ACTRATE = 2.965253  NET_T = 36
LINE 408:  851603  CUM BITS USED;  ACTRATE = 2.964861  NET_T = 35
LINE 409:  853598  CUM BITS USED;  ACTRATE = 2.964541  NET_T = 34
LINE 410:  855609  CUM BITS USED;  ACTRATE = 2.964277  NET_T = 33
LINE 411:  857464  CUM BITS USED;  ACTRATE = 2.963476  NET_T = 32
LINE 412:  859529  CUM BITS USED;  ACTRATE = 2.963403  NET_T = 31
LINE 413:  861437  CUM BITS USED;  ACTRATE = 2.962790  NET_T = 30
LINE 414:  863490  CUM BITS USED;  ACTRATE = 2.962677  NET_T = 29
LINE 415:  865458  CUM BITS USED;  ACTRATE = 2.962274  NET_T = 28
LINE 416:  867573  CUM BITS USED;  ACTRATE = 2.962375  NET_T = 27
LINE 417:  869561  CUM BITS USED;  ACTRATE = 2.962043  NET_T = 26
LINE 418:  871713  CUM BITS USED;  ACTRATE = 2.962270  NET_T = 26
LINE 419:  873739  CUM BITS USED;  ACTRATE = 2.962068  NET_T = 25
LINE 420:  875884  CUM BITS USED;  ACTRATE = 2.962270  NET_T = 24
LINE 421:  877819  CUM BITS USED;  ACTRATE = 2.961762  NET_T = 23
LINE 422:  879792  CUM BITS USED;  ACTRATE = 2.961385  NET_T = 22
LINE 423:  881750  CUM BITS USED;  ACTRATE = 2.960959  NET_T = 21
LINE 424:  883903  CUM BITS USED;  ACTRATE = 2.961189  NET_T = 20
LINE 425:  885942  CUM BITS USED;  ACTRATE = 2.961036  NET_T = 19
LINE 426:  888140  CUM BITS USED;  ACTRATE = 2.961414  NET_T = 19
LINE 427:  890133  CUM BITS USED;  ACTRATE = 2.961109  NET_T = 18
LINE 428:  892351  CUM BITS USED;  ACTRATE = 2.961551  NET_T = 18
LINE 429:  894399  CUM BITS USED;  ACTRATE = 2.961429  NET_T = 18
LINE 430:  896630  CUM BITS USED;  ACTRATE = 2.961912  NET_T = 18
LINE 431:  899006  CUM BITS USED;  ACTRATE = 2.962870  NET_T = 19
LINE 432:  901453  CUM BITS USED;  ACTRATE = 2.964058  NET_T = 20
LINE 433:  904242  CUM BITS USED;  ACTRATE = 2.966362  NET_T = 21
LINE 434:  907081  CUM BITS USED;  ACTRATE = 2.968819  NET_T = 22
LINE 435:  910054  CUM BITS USED;  ACTRATE = 2.971702  NET_T = 23
LINE 436:  912923  CUM BITS USED;  ACTRATE = 2.974233  NET_T = 24
```

FIG_6H

```
LINE 437:  915679 CUM BITS USED; ACTRATE = 2.976385  NET_T = 25
LINE 438:  918574 CUM BITS USED; ACTRATE = 2.978979  NET_T = 26
LINE 439:  921510 CUM BITS USED; ACTRATE = 2.981693  NET_T = 27
LINE 440:  924238 CUM BITS USED; ACTRATE = 2.983723  NET_T = 28
LINE 441:  926835 CUM BITS USED; ACTRATE = 2.985322  NET_T = 29
LINE 442:  929564 CUM BITS USED; ACTRATE = 2.987338  NET_T = 30
LINE 443:  931974 CUM BITS USED; ACTRATE = 2.988322  NET_T = 31
LINE 444:  934495 CUM BITS USED; ACTRATE = 2.989657  NET_T = 32
LINE 445:  936846 CUM BITS USED; ACTRATE = 2.990443  NET_T = 33
LINE 446:  939251 CUM BITS USED; ACTRATE = 2.991398  NET_T = 34
LINE 447:  941530 CUM BITS USED; ACTRATE = 2.991948  NET_T = 35
LINE 448   943733 CUM BITS USED; ACTRATE = 2.992254  NET_T = 36
LINE 449:  945893 CUM BITS USED; ACTRATE = 2.992423  NET_T = 36
LINE 450:  948010 CUM BITS USED; ACTRATE = 2.992456  NET_T = 36
LINE 451:  950307 CUM BITS USED; ACTRATE = 2.993055  NET_T = 37
LINE 452:  952587 CUM BITS USED; ACTRATE = 2.993598  NET_T = 38
LINE 453:  954941 CUM BITS USED; ACTRATE = 2.994371  NET_T = 39
LINE 454:  957315 CUM BITS USED; ACTRATE = 2.995204  NET_T = 40
LINE 455:  959733 CUM BITS USED; ACTRATE = 2.996170  NET_T = 41
LINE 456:  962219 CUM BITS USED; ACTRATE = 2.997343  NET_T = 42
LINE 457:  964550 CUM BITS USED; ACTRATE = 2.998029  NET_T = 43
LINE 458:  966908 CUM BITS USED; ACTRATE = 2.998797  NET_T = 44
LINE 459:  969206 CUM BITS USED; ACTRATE = 2.999375  NET_T = 45
LINE 460:  971660 CUM BITS USED; ACTRATE = 3.000432  NET_T = 46
LINE 461:  973906 CUM BITS USED; ACTRATE = 3.000844  NET_T = 47
LINE 462:  976093 CUM BITS USED; ACTRATE = 3.001073  NET_T = 48
LINE 463:  978085 CUM BITS USED; ACTRATE = 3.000703  NET_T = 48
LINE 464:  980058 CUM BITS USED; ACTRATE = 3.000276  NET_T = 47
LINE 465:  981963 CUM BITS USED; ACTRATE = 2.999643  NET_T = 46
LINE 466:  983903 CUM BITS USED; ACTRATE = 2.999119  NET_T = 45
LINE 467:  985813 CUM BITS USED; ACTRATE = 2.998507  NET_T = 44
LINE 468:  987676 CUM BITS USED; ACTRATE = 2.997754  NET_T = 43
LINE 469:  989619 CUM BITS USED; ACTRATE = 2.997247  NET_T = 42
LINE 470:  991684 CUM BITS USED; ACTRATE = 2.997111  NET_T = 42
LINE 471:  993772 CUM BITS USED; ACTRATE = 2.997045  NET_T = 42
LINE 472:  995855 CUM BITS USED; ACTRATE = 2.996964  NET_T = 42
LINE 473:  997856 CUM BITS USED; ACTRATE = 2.996637  NET_T = 42
LINE 474:  999913 CUM BITS USED; ACTRATE = 2.996479  NET_T = 42
LINE 475: 1001897 CUM BITS USED; ACTRATE = 2.996104  NET_T = 41
LINE 476: 1004016 CUM BITS USED; ACTRATE = 2.996133  NET_T = 41
LINE 477: 1005978 CUM BITS USED; ACTRATE = 2.995694  NET_T = 40
LINE 478: 1007965 CUM BITS USED; ACTRATE = 2.995332  NET_T = 39
LINE 479: 1009866 CUM BITS USED; ACTRATE = 2.994715  NET_T = 38
LINE 480: 1011850 CUM BITS USED; ACTRATE = 2.994348  NET_T = 37
LINE 481: 1013712 CUM BITS USED; ACTRATE = 2.993621  NET_T = 36
LINE 482: 1015670 CUM BITS USED; ACTRATE = 2.993181  NET_T = 35
LINE 483: 1017593 CUM BITS USED; ACTRATE = 2.992639  NET_T = 34
LINE 484: 1019600 CUM BITS USED; ACTRATE = 2.992346  NET_T = 33
LINE 485: 1021398 CUM BITS USED; ACTRATE = 2.991442  NET_T = 32
LINE 486: 1023407 CUM BITS USED; ACTRATE = 2.991159  NET_T = 31
LINE 487: 1025283 CUM BITS USED; ACTRATE = 2.990489  NET_T = 30
LINE 488: 1027297 CUM BITS USED; ACTRATE = 2.990223  NET_T = 29
LINE 489: 1029473 CUM BITS USED; ACTRATE = 2.990429  NET_T = 29
LINE 490: 1031793 CUM BITS USED; ACTRATE = 2.991051  NET_T = 30
LINE 491: 1034498 CUM BITS USED; ACTRATE = 2.992785  NET_T = 31
LINE 492: 1037159 CUM BITS USED; ACTRATE = 2.994385  NET_T = 32
LINE 493: 1039884 CUM BITS USED; ACTRATE = 2.996162  NET_T = 33
LINE 494: 1042553 CUM BITS USED; ACTRATE = 2.997772  NET_T = 34
LINE 495: 1045067 CUM BITS USED; ACTRATE = 2.998930  NET_T = 35
LINE 496: 1047691 CUM BITS USED; ACTRATE = 3.000398  NET_T = 36
```

FIG_61

```
LINE 497:  1050380  CUM BITS USED;  ACTRATE = 3.002046  NET_T = 37
LINE 498:  1052885  CUM BITS USED;  ACTRATE = 3.003163  NET_T = 38
LINE 499:  1055333  CUM BITS USED;  ACTRATE = 3.004113  NET_T = 39
LINE 500:  1057791  CUM BITS USED;  ACTRATE = 3.005088  NET_T = 40
LINE 501:  1060108  CUM BITS USED;  ACTRATE = 3.005659  NET_T = 41
LINE 502:  1062343  CUM BITS USED;  ACTRATE = 3.005996  NET_T = 42
LINE 503:  1064487  CUM BITS USED;  ACTRATE = 3.006074  NET_T = 42
LINE 504:  1066570  CUM BITS USED;  ACTRATE = 3.005980  NET_T = 42
LINE 505:  1068547  CUM BITS USED;  ACTRATE = 3.005589  NET_T = 42
LINE 506:  1070495  CUM BITS USED;  ACTRATE = 3.005118  NET_T = 41
LINE 507:  1072445  CUM BITS USED;  ACTRATE = 3.004654  NET_T = 40
LINE 508   1074400  CUM BITS USED;  ACTRATE = 3.004205  NET_T = 39
LINE 509:  1076487  CUM BITS USED;  ACTRATE = 3.004128  NET_T = 39
LINE 510:  1078457  CUM BITS USED;  ACTRATE = 3.003724  NET_T = 39
LINE 511:  1080730  CUM BITS USED;  ACTRATE = 3.004164  NET_T = 39
LINE 512:  1082841  CUM BITS USED;  ACTRATE = 3.004153  NET_T = 40
LINE 513:  1085038  CUM BITS USED;  ACTRATE = 3.004380  NET_T = 40
LINE 514:  1087263  CUM BITS USED;  ACTRATE = 3.004684  NET_T = 41
LINE 515:  1089451  CUM BITS USED;  ACTRATE = 3.004885  NET_T = 42
LINE 516:  1091756  CUM BITS USED;  ACTRATE = 3.005407  NET_T = 43
LINE 517:  1093879  CUM BITS USED;  ACTRATE = 3.005426  NET_T = 43
LINE 518:  1096116  CUM BITS USED;  ACTRATE = 3.005759  NET_T = 44
LINE 519:  1098354  CUM BITS USED;  ACTRATE = 3.006092  NET_T = 45
LINE 520:  1100405  CUM BITS USED;  ACTRATE = 3.005914  NET_T = 45
LINE 521:  1102473  CUM BITS USED;  ACTRATE = 3.005783  NET_T = 45
LINE 522:  1104509  CUM BITS USED;  ACTRATE = 3.005565  NET_T = 45
LINE 523:  1106449  CUM BITS USED;  ACTRATE = 3.005087  NET_T = 45
LINE 524:  1108343  CUM BITS USED;  ACTRATE = 3.004486  NET_T = 44
LINE 525:  1110183  CUM BITS USED;  ACTRATE = 3.003742  NET_T = 43
LINE 526:  1111992  CUM BITS USED;  ACTRATE = 3.002917  NET_T = 42
LINE 527:  1113982  CUM BITS USED;  ACTRATE = 3.002582  NET_T = 41
LINE 528:  1115902  CUM BITS USED;  ACTRATE = 3.002061  NET_T = 40
LINE 529:  1117999  CUM BITS USED;  ACTRATE = 3.002017  NET_T = 40
LINE 530:  1120142  CUM BITS USED;  ACTRATE = 3.002096  NET_T = 40
LINE 531:  1122259  CUM BITS USED;  ACTRATE = 3.002105  NET_T = 40
LINE 532:  1124299  CUM BITS USED;  ACTRATE = 3.001909  NET_T = 40
LINE 533:  1126391  CUM BITS USED;  ACTRATE = 3.001852  NET_T = 40
LINE 534:  1128513  CUM BITS USED;  ACTRATE = 3.001875  NET_T = 40
LINE 535:  1130543  CUM BITS USED;  ACTRATE = 3.001654  NET_T = 40
LINE 536:  1132575  CUM BITS USED;  ACTRATE = 3.001439  NET_T = 39
LINE 537:  1134503  CUM BITS USED;  ACTRATE = 3.000950  NET_T = 38
LINE 538:  1136454  CUM BITS USED;  ACTRATE = 3.000523  NET_T = 37
LINE 539:  1138235  CUM BITS USED;  ACTRATE = 2.999650  NET_T = 36
LINE 540:  1140141  CUM BITS USED;  ACTRATE = 2.999108  NET_T = 35
LINE 541:  1141918  CUM BITS USED;  ACTRATE = 2.998230  NET_T = 34
LINE 542:  1143832  CUM BITS USED;  ACTRATE = 2.997715  NET_T = 33
LINE 543:  1145610  CUM BITS USED;  ACTRATE = 2.996845  NET_T = 32
LINE 544:  1147521  CUM BITS USED;  ACTRATE = 2.996326  NET_T = 31
LINE 545:  1149308  CUM BITS USED;  ACTRATE = 2.995486  NET_T = 30
LINE 546:  1151247  CUM BITS USED;  ACTRATE = 2.995044  NET_T = 29
LINE 547:  1153027  CUM BITS USED;  ACTRATE = 2.994191  NET_T = 28
LINE 548:  1154937  CUM BITS USED;  ACTRATE = 2.993678  NET_T = 27
LINE 549:  1156779  CUM BITS USED;  ACTRATE = 2.992991  NET_T = 26
LINE 550:  1158769  CUM BITS USED;  ACTRATE = 2.992688  NET_T = 25
LINE 551:  1160623  CUM BITS USED;  ACTRATE = 2.992037  NET_T = 24
LINE 552:  1162655  CUM BITS USED;  ACTRATE = 2.991845  NET_T = 23
LINE 553:  1164474  CUM BITS USED;  ACTRATE = 2.991107  NET_T = 22
LINE 554:  1166445  CUM BITS USED;  ACTRATE = 2.990762  NET_T = 21
LINE 555:  1168277  CUM BITS USED;  ACTRATE = 2.990062  NET_T = 20
LINE 556:  1170302  CUM BITS USED;  ACTRATE = 2.989857  NET_T = 19
```

FIG_6J

| | | | |
|---|---|---|---|
| LINE 557: | 1172188 CUM BITS USED; | ACTRATE = 2.989299 | NET_T = 18 |
| LINE 558: | 1174234 CUM BITS USED; | ACTRATE = 2.989151 | NET_T = 17 |
| LINE 559: | 1176070 CUM BITS USED; | ACTRATE = 2.988469 | NET_T = 16 |
| LINE 560: | 1178104 CUM BITS USED; | ACTRATE = 2.988292 | NET_T = 15 |
| LINE 561: | 1180013 CUM BITS USED; | ACTRATE = 2.987798 | NET_T = 14 |
| LINE 562: | 1182032 CUM BITS USED; | ACTRATE = 2.987585 | NET_T = 13 |
| LINE 563: | 1183825 CUM BITS USED; | ACTRATE = 2.986802 | NET_T = 12 |
| LINE 564: | 1185744 CUM BITS USED; | ACTRATE = 2.986340 | NET_T = 11 |
| LINE 565: | 1187574 CUM BITS USED; | ACTRATE = 2.985655 | NET_T = 10 |
| LINE 566: | 1189544 CUM BITS USED; | ACTRATE = 2.985324 | NET_T = 9 |
| LINE 567: | 1191417 CUM BITS USED; | ACTRATE = 2.984751 | NET_T = 8 |
| LINE 568 | 1193302 CUM BITS USED; | ACTRATE = 2.984210 | NET_T = 7 |
| LINE 569: | 1195131 CUM BITS USED; | ACTRATE = 2.983531 | NET_T = 6 |
| LINE 570: | 1197021 CUM BITS USED; | ACTRATE = 2.983007 | NET_T = 5 |
| LINE 571: | 1198683 CUM BITS USED; | ACTRATE = 2.981917 | NET_T = 4 |
| LINE 572: | 1200390 CUM BITS USED; | ACTRATE = 2.980943 | NET_T = 3 |
| LINE 573: | 1201937 CUM BITS USED; | ACTRATE = 2.979576 | NET_T = 2 |
| LINE 574: | 1203526 CUM BITS USED; | ACTRATE = 2.978317 | NET_T = 1 |
| LINE 575: | 1204856 CUM BITS USED; | ACTRATE = 2.976423 | NET_T = 0 |

FIG_6K

DATA ENCODING USING ONE OR MORE ADAPTIVE DECISION TREES

FIELD OF THE INVENTION

The present invention relates to the field of data encoding; more particularly, the present invention relates to image coding for fixed-rate compression.

BACKGROUND OF THE INVENTION

Data compression is defined as the reduction in the space required for a set of data. Various methods of data compression are known in the art. Each data compression method includes an encoding scheme to encode the set of data. The purpose of encoding schemes is to reduce the data storage or transmission requirements for the representation of a set of data. Associated with the encoding (compression) method is a decoding (decompression) method to reconstruct the data from its encoded representation.

Quantization is an integral part of many data compression techniques. One quantization technique is the quantization of a sample sequence using information from neighboring samples. This is commonly referred to as sequential quantization. Two types of sequential quantizers are utilized: predictive coders and multipath search coders. Predictive coders predict the next sample and then quantize the difference between the predicted value and the actual value. The prediction is based on a combination of previously predicted values. Two well-known predictive coding schemes include delta modulation and differential pulse code modulation (DPCM).

DPCM is a class of lossy encoding schemes for signals. In a lossy encoding scheme, the reconstructed image does not match the original image exactly. Basically, in DPCM systems, the difference between a given sample and its predicted value is quantized and transmitted. The predicted value, which is obtained from previous predicted values and quantized differences, is also available at the receiver, since an identical predictor is used there. The receiver adds this predicted value to the received quantized difference in order to produce an approximation to the original sample in each case.

There are two types of DPCM coding schemes: fixed-rate and variable-rate. Fixed-rate schemes encode a given signal quantum (e.g., millisecond or pixel) with a fixed number of bits, such as eight bits. Fixed-rate schemes offer the advantages of simplicity, synchronous real-time encoding and decoding, and predictable buffer size or transmission time. Variable-rate schemes, on the other hand, require fewer or more bits in the less or more complex regions of the signal respectively. Variable-rate schemes offer the advantage of better compression for a given fidelity. In other words, variable-rate schemes offer better fidelity for a given compression ratio.

The operation of a DPCM system begins by filtering the signal to remove short-term excursions. For example, a noise removal filter or a low-pass filter can be applied. It should be noted that this type of filtering can be done as a separate first step or a similar effect can be achieved by modifying the primary encoding process. The purpose of removing noise is not solely to enhance the image, although this is a desirable side effect, but more importantly to improve signal fidelity at a given coded bit rate by suppressing the bit-expensive coding of such excursions.

The encoding process for each input sample comprises prediction, error quantization and code generation. Prediction includes predicting the next sample value based on some previous predicted values or differences. The predicted sample value is subtracted from the actual value of the sample. This results in an "error" value. The error value is replaced with (i.e., quantized as) a close value (e.g., the closest) in magnitude to the error value from a set of allowable values. The set of allowable values, which is denoted here as $V = \{a1, a2, a3, ..., ak\}$, is usually small, often as small as two. The quantized error value is whichever of the a1, a2, ... ak is numerically closest to the actual error value. This is the quantization. The value chosen is used for subsequent prediction so that the state can be learned by the decoder. Often the set of allowable values varies depending on the state of the previous encodings. For example, in one scheme where V is of size 2 and a fixed 1-bit per point encoding is achieved, the values a1 and a2 are skewed in the direction of the immediately prior encodings. This provides a "momentum" effect and allows an accelerating signal to be encoded.

The quantized error value is encoded in some fashion to form the compressed signal. Bit encoding can be fixed or adaptive. In fixed bit encoding, a given quantized error value is always encoded with the same sized bit string. In adaptive bit encoding, the encoding varies adaptively to achieve near-optimal compression given a statistical history. Thus, in adaptive bit encoding, the encoding varies, thereby allowing variable sized bit strings to represent the quantized error value (in DPCM systems). Bit encoding can also be instantaneous or non-instantaneous. In the instantaneous encoding, the appropriate output code bits in a given context can be determined immediately from the token (e.g., quantized error value) to be encoded. In non-instantaneous encoding, state information is retained in the bit encoder such that a given output bit may be determined by a plurality of encoded tokens (e.g., quantized error values). Examples of non-instantaneous coding include arithmetic coding. Non-instantaneous adaptive bit encoding offers improved compression. For simplicity, most of these codes operate only on binary decisions. Such binary non-instantaneous adaptive entropy codes are known in the art, often referred to as arithmetic codes. The encoded quantized error values form the compressed signal data (e.g., image) which is stored or transmitted.

When the compressed signal is decoded (decompressed), the signal is reconstructed in the same order and similar state information is constructed. Each sample is again predicted and the quantized error value decoded. As done previously, the predicted and error values are added to form the reconstructed sample value. All of the reconstructed sample values form the decoded signal.

In the prior art, some DPCM systems are adaptive. These adaptive designs consist of either adaptive predictors or adaptive quantization techniques. One adaptive quantization technique is referred to as error signal normalization and involves a memoryless quantizer which changes the quantizer intervals and levels according to the standard deviation of the signal, which is known to it. Another technique referred to as a switched quantizer changes the quantizer characteristics to match the difference signal and uses a few previous sample differences, two in the case of video, to determine the state of the difference signal.

Another technique, specifically applicable to images and referred to as spatial masking, uses both the previous samples on the scan line and samples from the previous scan line. A masking function is developed from the weighted sum of the gradients around a given picture element.

Multipath search coders (MSCs) use both previous and future sample values to select a quantized version of a given input sample. One type of MSC technique is tree coding. Tree coding makes use of a tree structure, where each typical sample sequence is stored as a sequence of branches in the tree. When the sequence is selected, its corresponding tree path is transmitted as a binary sequence, with each bit indicating a direction to follow at each sequential node of the tree. In other words, while proceeding through the samples, the subsequent samples are usually less correlated to the first sample and, thus, have more possible values. In this manner, this MSC technique resembles a tree structure.

As will be shown, the present invention provides a fixed-rate scheme for encoding data which allows a variable number of bits in regions of varying complexity of the signal. Thus, the present invention encodes a set of data samples using fewer or more bits with less or more probable samples while providing nearly constant bit rate compression.

SUMMARY OF THE INVENTION

It is an object of the present invention to provide a scheme which obtains the advantages of both fixed-rate and variable-rate DPCM encoding.

It is another object of the present invention to provide an adaptive quantization scheme which updates the model as data is compressed.

It is yet another object of the present invention to provide a compression scheme which varies the quantization levels to achieve approximately fixed-rate encoding.

It is still another object of the present invention to provide a method of heuristically controlled quantization fineness according to the type of data to be compressed.

It is a further object of the present invention to provide a scheme for determining the error classification set for quantizing data symbols.

These and other objects are provided by a method and apparatus for quantizing a stream of data at a predetermined bit compression ratio. A binary decision tree is established for classifying the error between a predicted and actual data value. The binary decision tree comprising a root node and multiple binary nodes represented by a pair of threshold values around the root node, a member of each pair representing a node in the binary decision tree and a threshold value indicative of a range of data values. The range in which the data values lies is then determined and a binary code representing the quantized error (token) between the predicted and actual data values is produced. The quantized error symbol (token) is then encoded and a bit string corresponding to the error symbol is output, thereby representing compressed data.

After a predetermined number of errors have been quantized (and encoded), the bit rate of the compressed data is compared to a predetermined (target) compression ratio. If the bit rate is greater than that dictated by the predetermined compression ratio, the size of the ranges is increased to encompass a wider range of data values, thereby decreasing the bit rate. If the bit rate utilized is less than the number of bits dictated by the predetermined compression ratio, the size of the ranges is decreased, thereby increasing the number of bits output per data value (i.e., increasing the bit rate). Thus, the present invention allows the error token to be quantized according to a set of error classifications in order to maintain a predetermined compression ratio.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiments, but are for explanation and understanding only.

FIG. 1 is illustrative of a binary decision tree.

FIG. 2 is a block diagram illustration of a coder/decoder employed in the preferred embodiment of the present invention.

FIG. 3 is a flow diagram of one embodiment of the present invention.

FIG. 4a is a flow diagram representative of the functions performed by a coder configured in accordance with the present invention and FIG. 4b is a flow chart of the functions performed by a decoder in accordance with the present invention.

FIGS. 5A–5C illustrates an array of threshold values for different size ranges utilized in the preferred embodiment of the present invention.

FIG. 6 illustrates the adjustment of threshold values to vary the ranges in accordance with the present invention.

DETAILED DESCRIPTION OF THE INVENTION

A compression/decompression system is described. In the following description, numerous specific details are set forth, such as specific numbers of bits, types of data symbols, tokens, etc., in order to provide a thorough understanding of the preferred embodiment of the present invention. It will be obvious to those skilled in the art that the present invention may be practiced without these specific details. Also well-known devices have been shown in block diagram form, rather than in detail, in order to avoid unnecessarily obscuring the present invention.

Although the present invention has applications to all types of data value sets to be compressed, an important application of the invention is color image compression. The compression/decompression system of the present invention will be described in terms of a system for compressing and decompressing image signals. However, it should be noted that the present invention is applicable to all types of signal quantum. In the following discussions, the term "pixel" is used to denote a scalar signal value. It should be noted that the scalar signal values could represent a variety of attributes, such as luminance, chromaticity, etc. The term "color pixel" is used to represent a tristimulus pixel.

In the image compression application, pixels are processed sequentially pixel by pixel, first by predicting the pixel value from prior retained values and then by encoding a quantized form of the prediction error, firstly into the bits of the path address of a "leaf" in one of multiple binary decision trees and then, secondly, into the productions of a binary entropy encoder. During the encoding, the image pixels are scanned in some fixed order. In one embodiment, a square-lattice array of pixels is used and is scanned in raster (lexicographic) order. However, it should be noted that the order could be hierarchical-raster, zigzag raster or other orders known in the art. It should be noted that the present invention is not limited to a square-lattice array of pixels. Other pixel compositions can be used, such as a hexagonal lattice array. Thus, the image signals are encoded pixel by pixel, while retaining information of prior pixel values (i.e., state information) synopsizing the already-encoded portion of the image.

In one embodiment, the state information comprises two line buffers of pixels. The first line buffer contains the line currently being encoded, and the second line buffer holds the line immediately prior.

The encoding process for each input point comprises prediction, error quantization and code generation. The present invention does not require a specific prediction method. In the currently preferred embodiment for image compression, a 3-pel prediction method is used in which the pixel at location (x,y) is predicted with the formula:

$$P(x,y) = B + C - \text{median}(A, B, C)$$

where $A = R(x-1, y-1)$, $B = R(x-1, y)$, $C = R(x, y-1)$, where $R()$ represents the reconstructed pixel value that the encoder uses. Alternative prediction formulas can be used such as $(A+B+C)/3$ or $(B+C)/2$.

Optionally, a dithering term can be added to the predicted value. The dithering term should be a pseudo-random value with a zero mean and a standard deviation of about one-third the smallest distance between the allowable values a1, a2, etc. Use of a dithering term is well-known in the art. It should be noted that dithering is not utilized in the currently preferred embodiment.

Using the prediction method, a value is predicted for the pixel. The predicted pixel value is then subtracted from the actual original pixel value, resulting in an "error" value. The error value is quantized using a set of allowable values. Each set of allowable values in the present invention are referred to as an error class. In the currently preferred embodiment, one of the allowable values is always zero. However, it should be noted that there is no requirement that a zero value be allowed. In another embodiment, the value nearest to zero fluctuates periodically among two or more values which average to zero. This alternate embodiment, in effect, is an alternate means of achieving the effects of dithering.

The ability to vary the set of allowable values ($V = \{a1, a2, ..., ak\}$) serves to provide improved fidelity for a given compression rate. The present invention varies the allowable values dynamically to approximate a fixed compression ratio. Thus, in regions of high signal activity, the allowable values V are spread out to improve compression at the expense of greater quantization error, while in regions of low activity the values are compacted to improve fidelity at the expense of compression. In one embodiment, this dynamic adjustment proceeds slowly (i.e., the feedback is time-averaged, "damped", or "low-passed"). It should be noted that the "quantization error" mentioned above is not the "prediction error", but rather the difference between the actual prediction error and its quantized (approximated) encoding.

After quantization, the quantized error value is encoded in some fashion to form the compressed signal. The quantized error value is added to the predicted value and the sum replaces the original pixel value in the buffer. If the data values being quantized were originally derived from image data, the sum is saved in the buffer as $R(x,y)$. The encoded quantized error values form the compressed image which is stored and transmitted.

When the image is decoded (decompressed), the image is reconstructed in the same order and the same state information is constructed. Each pixel is again predicted, and the quantized error value decoded. Again the predicted and error values are added to form the reconstructed pixel value $R(x,y)$. Collectively, the $R(x,y)$ values form the decoded image. If a preliminary low-pass filter was performed during encoding to improve code efficiency, it may be appropriate to include an image-sharpening process after the decoding.

OVERVIEW OF THE PRESENT INVENTION

In the present invention, the multiple sets of allowable values define a plurality of classes. The plurality of classes correspond to nodes of a binary tree. Each pixel is encoded with such a class, denoted as the pixel's class code. There may be a plurality of such trees (zones), with the encoder and the decoder agreeing on which tree to use. Each class code is a binary value having a length of a number of bits. The bits of the code represent the binary decisions down the binary tree from the root node to the node corresponding to the threshold value indicative of the range of data values within which the input data value (symbol) lies. It should be noted that although a range is defined by a lower threshold and an upper threshold, it may be simplified by identifying the range by a single threshold, e.g. the lower threshold wherein the threshold for the adjacent range identifies the upper threshold.

The trees of the binary decisions provide the present invention with flexibility. A plurality of trees allows for better probability estimates to be produced and also heuristic control over quantization fineness. An example of the structure of a decision tree in the present invention is shown in FIG. 1.

After the prediction error, $d = D(\text{original}) - D(\text{prediction})$, is determined, it is quantized into a range. The input data values to be encoded are quantized into a succession of binary events. Referring to FIG. 1, the root node of the tree 100 contains two branch nodes 110 and 111 which correspond respectively to a binary zero and binary one of the code. Node 101 represents the range ("quantization range") $-k1 <= d <= k1$. Tree 100 also includes nodes 102, 103, 104, 105, and 106 and others which are not depicted. Node 102 is coupled to node 101 by branch 111 an corresponds to the "0" quantization. Branches 113 and 112 couples nodes 103 and 104 respectively to node 102. Nodes 103 and 104 (via branches 118 and 115 respectively) represent the ranges of $-k2 <= d < -k1$ and $k1 < d <= k2$ respectively. Furthermore, branch 118 and branch 115 are represented by the binary code 101 and 110. Branches 119 and 114 couple nodes 105 and 106 respectively to nodes 103 and 104 respectively. Node 105 corresponds to the range $-k3 <= d < -k2$ and a binary code of 1001. Node 106 corresponds to the range $k2 < d < -k3$ and a binary code of 1110. The ranges continue on both the positive and negative side.

Each node has a range of threshold values associated with it. The threshold values used in a particular system are dependent on the character and range of data values. For example, when quantizing image data, it is often desirable to provide greater precision in certain ranges of color and intensity because the eye is more sensitive to changes at particular ranges. In particular, if the data values are symbols identified by numbers in the range of 100–300, the three threshold values will be in the range of 100–300. If the data values are translated to probability or error values prior to coding, the range of threshold values will be much smaller, reselecting a fine quantization. In the following description of the preferred embodiment, error values, reflecting the error determined between a predicted data value and the actual data value are coded. Therefore, the threshold values reflect a range of possible error values. However, it will be obvious to one skilled in the art that the data types can be varied as well as the range of threshold values, without departing from the spirit and scope of the invention.

Referring to FIG. 1, a modified unbalanced binary tree employed in the preferred embodiment is shown in FIG. 1. The first binary decision determines whether the value to be compressed is in the region between $+k1$ and $-k1$. If the data value is in the region, the quantization is complete (a binary 1 is output) and the process proceeds to the next data value to be quantized. If the data value is not within the region delineated by $\pm k1$, the next decision determines the sign of the data value indicating which side of the binary tree and the region the value lies within. If the value is positive and not within the range of $\pm k1$, the next test determines whether the value is in the region between k1 and k2 by determining whether the data value is less than k2. If it is not, then the next decision in the tree is to determine whether the input data value is in the region between k2 and k3 by determining whether the data value is less than k3. Similarly, if the value is negative, the same steps will be performed with respect to $-k2$ and $-k3$.

When the regions are decreased in size by decreasing the threshold values, other regions will be increased, increasing the likelihood that the data value will be within one of the increased ranges. Furthermore, in the present invention, as the regions are decreased, additional regions are added to the outside ranges. Thus, as the regions are decreased, the number of regions are increased. For example, if the value of k1 is decreased, the region defined by k1 and k2 will be increased, thereby increasing the probability that the data value will be in the region k1–k2. Also, other regions are added to the outside probability ranges. Similarly if the threshold values k1 and k2 are decreased in value, the region defined by k1 and k2 will be decreased while increasing the range defined by k2 and k3. Also, in this case, the number of ranges is decreased. The value of k2 may also be decreased, thereby not only decreasing the region between k1 and k2, but increasing the region between k2 and k3 and, therefore, increasing the likelihood that an input value will fall into a range greater than k3 which requires more bits to represent the path of the binary tree to the node of the region. The values of k1, k2 and k3 are dependent upon the range of possible values to be compressed and the type of data to be compressed. Moreover, the total number of ranges in one embodiment of the present invention is dependent upon the range of positive values to be compressed and the type of data to be compressed.

In the currently preferred embodiment, the data values and threshold values for the binary tree are representative of the prediction error for a pixel. In this embodiment, the pixels are processed by predicting the pixel value, for example, the luminance value, from prior luminance values and comparing the predicted value to the actual value to generate a prediction error. This prediction error is then quantized according to the path address for the node indicative of the range the prediction error falls in. It will be understood that a certain level of precision and accuracy is required for luminance, but a different level may be required for chromaticity. Therefore, a plurality of binary trees may be utilized and selected according to the type of data and, furthermore, according to the initial input value. The initial value must be known by the decoder. An illustration would be that chromaticity requires high accuracy in the brown and purple regions but can be relaxed somewhat in the green regions. Thus, the data could be tested for the color regions and a binary tree selected according to the region that is determined.

As previously mentioned, the selected range is viewed as being determined by a sequence of binary decisions. The range values can be any threshold values. In the currently preferred embodiment, the threshold values are chosen by selecting symmetric thresholds $(-k3, -k2, -k1, k1, k2, k3)$, although the thresholds, could have been asymmetric. Each node in the binary decision tree contains an associated probability estimate. In FIG. 1, these probability estimates are labeled P1–P6. The probability estimates are the only storage cost associated with each node. In the currently preferred embodiment, the probability estimates are stored as B-bit values.

Specifically with regard to image compression, because of subjective image considerations, the thresholds are chosen as multiples of the other thresholds. For instance, in the currently preferred embodiment, the thresholds are chosen as:

$$k2 > 3 * k1$$

$$k3 > 5 * k1$$

In general, there will be a "runt" error range at each extreme point. For a slight performance improvement in the currently preferred embodiment, this "runt" error range may be coalesced with the adjacent range if it is less than half its size. In other words, if any of the prediction error values are outside the range of thresholds, then the range which is nearest to the values are used to quantize the prediction error.

In one embodiment, the threshold values (k1, k2, k3, ... ) are taken from one row in a quantization table. The quantization table (T table) is an array of threshold values for different size ranges for quantizing the input. An illustrative table is shown in FIG. 5. In one embodiment, there are about 100 such rows, preferably numbered by increasing quantization coarseness. The selected row index may be given by:

$$\text{row index} = Rg + Rt$$

where Rg is a global variable controlled to achieve a preset fixed bit rate and Rt is a per-tree heuristic. Various heuristics can be used in selecting trees.

Referring to FIGS. 5A–5C, a T table of 152 rows, each row representative of the threshold values for a binary tree. The number of threshold values ranges from 13 threshold values down to a single threshold value. In the preferred embodiment, the process may start with the tree as representative of the 52nd row containing threshold values 13, 45, 84, 129, 180, 236 and 299. Depending upon the input values and the target bit range, the ranges may be compressed by going to a lower numbered row such as 51 or expanded by going to a higher numbered row. In one embodiment, the ranges are varied a single row at a time.

FIGS. 6A–6K is a sample output generated according to the preferred embodiment out of the present invention. Five hundred and seventy-five lines of an image are encoded as compressed output. For each line, the number of bits utilized to encode the line are identified followed by the actual bit rate per line and the T table row value (referred to as the throttle) is identified. Thus, as illustrated in FIG. 6, with respect to line 1, only 905 bits were utilized. Thus, it is desirable to decrease the size of the ranges in order to increase the bit rate as reflected in the net T value being set to 19. The next line shows 2,788 bits utilized resulting in an actual bit rate of 1.98 and a throttle of 16, identifying that the number of rows moved which reflects the change in sizes of the ranges of the binary tree changed 16 steps. Looking further down the lines from line 8 through 159, the actual bit rate is within the allowable range of the target bit rate and, therefore, the threshold values are not adjusted as reflected by the net T value equal to zero. As the image changes, so may the number of bits utilized to represent the image at a line and, therefore, it may be required to change the threshold values of the binary tree in order to adapt to the actual data being compressed. This is shown by the changes in the vicinity of line 225 as well as the changes in the vicinity of lines 279 through 550 reflecting a large difference in the number of bits utilized.

BIT ENCODING

The present invention is capable of using either a fixed or adaptive bit encoding in conjunction with instantaneous or non-instantaneous encoding. The following embodiment is a simple scheme which achieves near-optimal compression with a fixed rate of 2.0 bits per pixel using fixed-string instantaneous encoding. Assuming that five allowable error values with fixed encodings and occurrence frequencies are as follows:

| −A | 111 | 12.5% |
| −B | 110 | 12.5% |
| 0  | 0   | 50%   |
| +C | 100 | 12.5% |
| +D | 101 | 12.5% |

If the indicated occurrence frequencies are achieved two goals are satisfied: (1) the entropy coding is optimal (for a certain quantization) in the sense of the Shannon limit, and (2) a rate of exactly 2.0 bits per pixel is achieved. In one embodiment, the target occurrence frequencies are achieved by calculating the decaying averages of the actual frequencies and slowly migrating the values of −A, −B, +C, +D in the direction to compensate for any difference between target and actual frequencies.

Non-instantaneous adaptive bit encoding offers improved compression and is used in the currently preferred embodiment. For simplicity, the codes operate only on binary decisions. Binary non-instantaneous adaptive entropy codes are known in the art, often referred to as arithmetic codes or binary entropy codes. Any such code can be used with the present invention. An example of such an entropy code is the Q-Coder. It should be noted that the only constraints on the present invention is that such codes operate on binary decisions made in any of a plurality of contexts and where the constructed bit output encodes each such decision. A variety of encoding processes can be utilized. The encoded quantized error values form the compressed image which is stored or transmitted.

When an error class set has size greater than two, the quantized error must be represented as a leaf in a binary tree in order to conform to the requirements of such a binary entropy code. Each non-leaf node in the tree denotes an encodable binary decision. The quantized error class is denoted as the path address of the corresponding leaf node. In one embodiment, the binary leaf address may be used as the actual output bit string (instantaneous non-adaptive code) or, in another embodiment, the decisions may be submitted one-by-one to a non-instantaneous adaptive code.

Numerous methods can be employed to achieve entropy coding in the present invention. First, renaming the allowable value set V to be equal to:

$$\{N(k), N(k-1), ..., N(1), Z, P(1), ..., P(k)\}$$

where $N(k)<N(k-1)<...<N(1)<Z<P(1)<...P(k)$ and where Z is the element nearest to zero. This renaming results in multiple possible embodiments of trees which are preferred for organizing these elements to be the leafs of a binary tree. In one embodiment, the root of the tree divides the set into one set which contains Z and another set which contains all of the other elements. The latter set is then subdivided into a set which contains all elements greater than Z and a set which contains all of the elements less than Z. The positive elements, depicted P(1), P(2), etc., then branch off as singletons in order of smallest to largest. Similarly for the negative elements, denoted N(1), N(2), etc., branch off from the lowest negative value in magnitude to the highest.

In another embodiment, the root of the tree separates Z into its own set. However, in contrast with the previous embodiment, the sets {P(1), N(1)},{P(2), N(2)}, etc. are separated off as doubletons in the order from those having magnitudes closest to Z to those having magnitudes farthest from Z. In using the tree, the final decision is whether the current decision is greater than Z.

In yet another embodiment of the tree, the root of the tree separates V into those elements greater (or less) than Z into one set. The element Z is then separated, with the separation proceeding as in the first embodiment, wherein the positive elements branch off as singletons in order of smallest to largest and the negative elements branch off from the lowest negative value in magnitude to the highest.

The present invention is sensitive to the number of bits output as compressed data and can adapt itself to output at a bit rate consistent with a target bit rate specified by the user or the system. This is preferable, for example, when memory for storing data is of a predetermined and limited size or when the bit transmission rate of an input/output device cannot exceed a certain limit.

In the system of the present invention, after a predetermined number of data values have been quantized (and subsequently output in a compressed form), the number of bits output is compared to the target bit rate or target compression ratio. If the actual bit rate is greater than the target bit rate, the size of the quantization ranges are increased such that the classes closer to the root node, which utilize a smaller number of bits as its class code, are used more frequently thereby decreasing the bit rate. Similarly, if the target bit rate is less than the actual bit rate, the ranges will be decreased in size to increase the frequency that the input data value lies within the ranges further away from the root node that utilize a greater number of bits.

With respect to image compression, at the end of every scan line in the one embodiment, the target bit rate is compared with the actual bit rate and the values of the elements of each error class set (i.e., the "quantization ranges") are adjusted slightly in an attempt to migrate the actual bit rate towards the target. For example, the elements of the set v might be the elements of:

$$\{-228,-139,-84,-50,-29,-16,-8,-3,$$
$$0,+3,+8,+16,+29,+50,+84,+139,+228\}$$

multiplied by $Rg+Rt$ where $Rg$ is a global throttling term adjusted slowly to achieve the target bit rate and $Rt$ is the constant associated with the selected tree when a plurality of trees are in use. In this example, for all of the elements, $N(k) = -P(k)$. It should be noted that this is not required. Note that in the example above, the elements of V become more divergent as they become more distant from Z. This is appropriate both because it reduces net quantization error for typical distributions as shown by Lloyd-Max and in view of the sub-linear character of human perception. For more information on Lloyd-Max Quantizer, see Gersho, Allen. and Robert M. Gray, Vector Quantization and Signal Compression, Kluwer Academic Press 1992, pg. 165. Also human visual perception does not require accurate luminance rendition in the vicinity of edges. In the preferred implementation, the value $Rg+Rt$ is taken to be the row index of a table containing the precomputed values of Z, N(K) and P(K).

Some binary entropy codes operate non-optimally for very likely decisions (i.e., decisions which assume a given actual value more than 99% of the time). in this instance, compression can be improved with a simple heuristic. When the statistics bin of a decision context indicates that the decision assumes a given value more than 99% of the time, the decision is forced to that state regardless of its actual value, and no action is performed by the bit encoder. The statistics bin is then put in a special state such that this heuristic is bypassed on its next encounter. (This allows the continued recording of and adjustment to changing statistics. This heuristic is also bypassed whenever it has already been used at another node in the encoding of the pixel. This prevents the decoding of divergent wrong pixels.

ERROR CLASS SET DETERMINATION

It should be noted that a single tree could suffice in principle. However, in the currently preferred embodiment, multiple trees are used to achieve improved compression for a given quality (or equivalently improved quality for a given compression) by giving better probability estimates and also allowing heuristic control over quantization fineness. The same signal decision model which predicts pixel values is also responsible for determining a pixel context group. For tristimulus (color) images, there is one group of pixel context groups for luminance and one or two groups for chromaticity.

When the predicted pixel value is near the upper limit of its range (e.g., high luminance), a large positive error value is impossible. Similarly, a large negative error value is impossible when the prediction is for low luminance. A good compression system should take advantage of this. Moreover, since each pixel class context has its own set of statistics bins, probability estimation is made more accurate by grouping similar image areas into the same bins and differing areas into different bins.

One preferred embodiment for signals whose valid range is (0,1 , ..., 255) provides 6 context groups for luminance, depending on the predicted pixel value (pv):

| Group 1 | pv | in | (0, 31) |
|---|---|---|---|
| Group 2 | pv | in | (32, 63) |
| Group 3 | pv | in | (64, 127) |
| Group 4 | pv | in | (128, 191) |
| Group 5 | pv | in | (192, 223) |
| Group 6 | pv | in | (224, 255) |

Multiple trees provide better probability estimates and also allow heuristic control over the degree of quantization. This is especially critical in some applications. For instance, in image compression, chromaticity must be very accurate in the brown and purple regions and not so accurate in dark green areas. Therefore, in this case, the pixel values in the brown and purple regions use trees having probability estimates which have smaller ranges, thereby reducing the degree of quantization, while pixels in the dark green areas can be quantized using probability estimates that encompass larger ranges, which raises the degree of quantization.

ONE EMBODIMENT OF THE SYSTEM OF THE PRESENT INVENTION

FIG. 2 illustrates an exemplary system in accordance with the preferred embodiment of the present invention. Illustrated is the combined compression/decompression system for image data such as that required for facsimile transmission. However, the system is not limited solely to this application and can be easily adapted to operate with respect to any type of data, in the compression mode, the original image 416 is ordered and sub-sampled by scanner/sample 417 to yield the sequence of digital data values. The scanner/sample device 417 preferably includes a scanner which translates the physical image into signals and a sampler which samples the signals at a predetermined frequency to generate digital image data. However any device which generates an output of digital data for compression can be used. The type of sampling performed is dependent on the image and application. For example, the image can be sampled in a zigzag raster order or in the form of a hexagon sampled grid. Furthermore, the pixels comprising each image preferably has a plurality of components, such as luminance, chromaticity, and x,y coordinate location which, when sub-sampled, are interweaved in a deterministic way such as a single raster or a zigzag scan.

Each data value is subtracted by the subtracter 419 from a predicted data value 402. The predictor 402 predicts the value of the component, i.e. data value to be encoded from some of the already processed components which are returned in prior image state buffer 401. The prediction is typically made on the basis of neighboring data values. The predictor may consist of a simple state machine or processor with the predicted value determined on an ad hoc basis or random access memory in which a look-up table is stored containing possible predicted values which are indexed according to input information (e.g., the values of k1, k2 and k3).

The predicted value generated by the predictor 402 and the actual value output by the scanner sampler 417 are subtracted by subtracter 419 to generate the difference which corresponds to the error value. This error value is input to the classification (quantization) mechanism 406. Also input to the classification (quantization) mechanism 406 is a row of the T table 420 (FIG. 6). The values in the T table 420 are threshold values and preferably contain the midpoint values between adjacent values in the corresponding row of the R table (discussed below). Using the threshold values provided by the T table 420 and comparing the error value output by the subtracter 419, the quantization range or class in which the error value lies is determined and the quantization range is input to an encoder/decoder 41 3. Encoder/decoder 13, in response, encodes the class and outputs it as part of the output bit stream. The entropy coding of the quantization range depends on probability estimates selected from a look-up table 415 in memory which are maintained separately for each tree. The tree is determined by the magnitude of the predicted component, its horizontal position in the image and its quantity value. The tree select mechanism 412 outputs a signal to the look-up table to select the probability estimates.

It should be noted that the embodiment described encodes the quantized error value to generate the bits output as part of the bit stream. The encoder is not limited to any type of encoder, but preferably may be an encoder of the type described earlier. Alternately, the system may be configured not to include an encoder, but rather the quantized error value (i.e., delta class) itself is output as part of the output bit stream.

The output of the encoder/decoder 413 is also input to a buffer which stores the number of bits output in order to generate a number corresponding to the actual bit rate 410. For example, when a line of image data is encoded and output, the number of bits utilized to encode the scan line of data, as maintained by the buffer 410, is subsequently output to comparator/adjuster 408 which compares the target bit rate 409 to the actual bit rate 410. This determines the difference between the target bit rate and actual bit rate, referred to as the overall coarseness value.

The overall coarseness value output by the adjuster 408 is added to any tree bias (at 407) provided by the tree bias register 411. Tree bias is determined in part by the user and may be set according to the type of data or the particular application. The particular tree bias term is dependent upon the selected tree. The tree bias added to the overall coarseness term produces the quantization coarseness term, which is then input to the T table to select a proper row used to determine class threshold values to be used with processing of subsequent pixels.

The result of the addition of the overall coarseness value is input to the R table. The output of the quantization 406 selects an R value and adds (405) it to the prediction from 402 (compression) to form the reconstructed component values. The reconstructed component values are then stored in prior image buffer 401 and the reconstructed image buffer 423 (decompression).

In the decompression mode, the compressed bit stream 414 is input to the encoder/decoder 41 3 to perform a decode operation. As with the encoding sequence, the same procedure is utilized in the reverse fashion. The compressed image is input and determines the quantization range, the R value and the reconstructed component (405). The quantization range is output to the classification mechanism 406. The quantization range is then input to the R table in conjunction with the quantization coarseness term output by adder 407 to index the R table. The R table is a random access memory (RAM) having a look-up table comprising representative error values for each quantization range. In one embodiment, the R table contains error values which are the midpoints of each quantization range. As the T table contains the threshold values identifying the ranges for each quantization range, the R table can be viewed as the midpoint value between adjacent values in a corresponding row of the T table. The output of the R table 404 is an R value which is input to the adder 405 which, along with the value generated by the predictor 402, produce the reconstructed image after processing through the inverse procedure of the scan/sampler 417.

Although the above discussion refers to a single binary tree, the data values may be predicted, quantized and encoded/decoded utilizing a separate binary tree for individual data values (e.g., for different data types and ranges of data values) and subsequently output as a single output bit stream.

Referring to FIG. 3, process flow for one embodiment of the present invention is illustrated. At step 300, the ranges of the binary tree are determined and delineated by the threshold values which correspond to the nodes of the binary tree. At step 305, each range is identified as a class code (i.e., quantization range). As will be shown later, this code is encoded and output as the bit stream for transmission or storage of compressed data. At step 310, the first data value to be compressed is retrieved. Comparison is made between the ranges and the data value digits to determine the range the data value is within. The actual comparison is performed by comparing the data value to the threshold values. At step 320, the corresponding class code is selected and encoded for output as part of the output bit stream.

At step 325, a comparison is made to determine whether a predetermined number of data values have been processed and output as compressed data. For example, a count may be made to determine a block of data representative of a scan line of image data. If the predetermined number of data values have been output, then a comparison is made to determine the relationship between the number of bits output to the target bit rate, which is the preferable number of bits to be output per a predetermined number of data values such as a scan line. At step 345, if the number of bits output is greater than the target bit rate, then, at step 350, the ranges are expanded. If the number of bits is less than the target bit rate (step 355), then the ranges are contracted (step 360).

By expanding the ranges, the ranges encompassing the area around the root node will be wider, thereby increasing the probability that the data value falls within those ranges. This, in turn, reduces the number of bits required to output because the class code, which in this embodiment corresponds to the data path through the binary tree, requires a fewer number of bits because a fewer number of nodes are included in the data path for those nodes closest to the root node. Correspondingly, if the ranges are contracted, then this decreases the likelihood that the data value falls within those ranges closest to the root node, but instead falls within those ranges further away from the root node, thereby requiring a greater number of bits to be output representative of the path of nodes through the binary tree. In turn, this increases the actual bit rate. Preferably, the ranges are expanded and contracted by modifying the index into the T table which contain the threshold values for a range of different quantization coarseness. For example, the index to the current row of threshold values can be decreased to index a row of threshold values narrower in spacing. Alternately, the index to the T table can be increased to index a row of threshold values spaced wider apart.

Once the ranges have been expanded or contracted, the next data value is retrieved (step 330), and if all data values have been compressed (step 335), the process is terminated. If all data values have not been compressed, the process continues again for each data value starting at block 315 until all data values have been compressed. Thus, the ranges are expanded and contracted as needed in view of the type of data and the ranges of data values for a particular set of data values to be quantized yielding a bit rate which is close to the target bit rate.

FIGS. 4a and 4b show another embodiment of the present invention. FIG. 4a illustrates the process flow for encoding data values and FIG. 4b illustrates the process flow for decoding data values. Referring to FIG. 4a (at step 400), the ranges are identified with their class codes which represent the binary decisions through the binary tree to reach the node corresponding to the threshold value of the range the data value is within. At step 405, the first actual data value is retrieved and, at step 410, a predicted data value is generated. This predicted data value may be determined from data values in the vicinity of the data value, such as the adjacent data values or the predetermined number of previous data values. At step 470, which tree to use is determined. At step 415, the predicted data value and the actual data value are compared and an error value is generated as the difference between the actual data value and the predicted data value. This error value is compared to the ranges of the binary tree to determine the range the error value falls within. The corresponding class code, at step 425, is encoded and output as part of the output bit stream.

At step 430, a check is made to determine whether a predetermined number of data values have been output. If a predetermined number of data values have been output, at step 435, a determination is made as to whether the output bit stream is greater than the target bit rate. (The target bit rate is the predetermined bit rate determined to be desirable for this particular application. ) If the output bit stream is greater than the target bit rate, the ranges are expanded in order to decrease the number of bits output as part of the output bit stream. At step 445, if the output bit stream is less than the target bit rate, the ranges are compressed in order to increase the number of bits output as part of the output bit stream step 450. This process is continued until all the data values have been processed at which time the process is terminated 465.

The corresponding decoder is illustrated by the flow chart of FIG. 4b. At step 500, the ranges are identified and the class codes determined. At step 505, the first compressed class code is retrieved. At step 51 0, the class code is decoded. A predicted data value is generated using the same process utilized in the encoder and, at step 520, and error value is determined. This error value preferably is a mid-point error value for the range of values corresponding to the class code. At step 525, the actual data value is generated from the predicted data value and selected error value using the reverse process employed in the encoder. As in the encoder, the ranges are adapted according to the type of data. Thus, at step 530, if a predetermined number of data values have been reconstructed, the input stream, that is the compressed class code, is compared to the target bit rate and, at step 535, if the input stream is greater than the target bit rate, the ranges are expanded, step 550, and if the input stream is less than the target bit rate, step 540, at step 545, the ranges are compressed. This process will continue for the remainder of the compressed class codes to reconstruct the data values until all class codes have been processed at which time the process is terminated (step 565).

While the invention has been described in conjunction with the preferred embodiment, it is evident that numerous alternatives, modifications, variations and uses will be apparent to those skilled in the art in light of the foregoing description.

A method and apparatus for encoding data has been described.

I claim:

1. A method for compressing a plurality of data at a predetermined compression ratio comprising the steps of:
   providing a first class set having a first plurality of error value ranges, wherein each error range covers a sequential set of error values and is identified by a class code representing the sequential set of error values associated with said each range, and further wherein a class code encompassing error values having a greater frequency of occurrence employs a lesser number of bits than a class code for a class encompassing error values having a lesser frequency of occurrence;
   quantizing said data using said at least one class set, wherein the step of quantizing includes generating for each data value an error value representing a difference between said data value and a predicted data value, identifying one of the plurality of error value ranges encompassing the error value, and assigning class codes to each data value, such that each data value is associated with a class code;
   generating an output representative of the class code as part of an output data stream; and
   varying said first class set after a predetermined number of class codes have been represented as part of the data stream, wherein the step of varying includes adjusting the first class set to provide a second class set having a second plurality of error value ranges different in size from the first plurality of error value ranges, such that error value ranges are adapted to maintain the compressed data stream in the proximity of the predetermined compression ratio.

2. The method as defined in claim 1 wherein said step of varying includes comparing a number of bits of the output utilized to represent the class code in the data stream with the predetermined compression ratio.

3. The method as defined in claim 2 wherein if the number of bits utilized is greater than the predetermined compression ratio then the ranges of error values is modified in size for the first class set such that error value ranges encompassing error values having a greater frequency of occurrence are increased in size to encompass a wider range of error values, thereby decreasing the compression ratio, and if the number of bits utilized is less than the predetermined compression ratio then the range of error value ranges for the first class set is modified in size, such that error value ranges encompassing error values having a greater frequency of occurrence are decreased in size to encompass a narrower range of error values thereby increasing the compression ratio.

4. The method as defined in claim 1 wherein the step of quantizing the data includes the steps of:

generating a predicted data value for the data value to be quantized;

determining the difference between the predicted data value and the data value, such that an error value is generated for the data value; and identifying the class for the data value to be quantized by determining the range of error values the error value is within.

5. The method as defined in claim 1 wherein the step of outputting includes the step of encoding the class code.

6. The method as defined in claim 1 wherein the step of providing comprises the step of providing at least one binary decision tree having a root node and a plurality of binary nodes represented by pairs of threshold values, each member of each pair of threshold values representing a node in the binary decision tree and a threshold of a range of data values.

7. The method as defined in claim 1, 2, 3, 4, 5 or 6 wherein the step of providing comprises the step of providing at least one binary decision tree having a plurality of leaf nodes and at least one non-leaf node arranged into a rooted binary tree, each leaf node represented by pairs of threshold error values, each member of each pair of threshold error values representing a node in the binary decision tree and a threshold of a range of data values and each said at least one non-leaf node representing a binary decision required to arrive at an appropriate one of the plurality of leaf nodes.

8. The method as defined in claim 7 wherein said step of providing at least one binary decision tree includes converting a root node in the rooted binary tree directly to one leaf node containing a predetermined quantization range and another leaf node is further subdivided into a first sub-tree containing all thresholds greater than the predetermined quantization range and a second set containing all threshold less than the predetermined quantization range.

9. The method as defined in claim 7 wherein said step of providing at least one binary decision tree includes connecting a root node in the rooted binary tree directly to one leaf node containing a predetermined quantization range and another leaf node containing quantization ranges other than the predetermined quantization range, wherein said another leaf node is further subdivided into a sub-tree containing threshold error values, having equal magnitude and opposite signs.

10. The method as defined in claim 7 wherein said step of providing at least one binary decision tree includes connecting a root node in the rooted binary tree directly to one leaf node containing quantization ranges greater or less than a predetermined threshold error value and another leaf node containing the remaining quantization range.

11. The method as defined in claim 1 wherein said step of varying occurs at the end of a predetermined number of scan lines.

12. The method as defined in claim 11 wherein said predetermined number of scan lines equal 1, such that said step of varying occurs at the end of every scan line.

13. A method for compressing a stream of data at a predetermined compression ratio, said method comprising the steps of:

providing a first class set having a first plurality of error value ranges, wherein each error value range covers a sequential set of error values arid is identified by a class code representing the sequential set of error values associated said each error value range and further wherein a class code encompassing error values having a greater frequency of occurrence employs a lesser number of bits than a class code for a class encompassing error values having a lesser frequency of occurrence;

generating a predicted data value for the data value to be quantized;

determining an error value as the difference between the predicted data value and the data value to be compressed;

identifying a class code for the data value by determining an error value range in the plurality of error value ranges the error value is within;

encoding the class code to a first code comprising at least one bit, such that the data value is quantized;

outputting the first code as part of a compressed data stream;

after outputting the first code for a predetermined number of data values, comparing a number of bits utilized to output the compressed data stream representing data values to the predetermined compression ratio;

if the number of bits utilized is greater than the predetermined compression ratio, modifying the first plurality of error value ranges in size for the first class set to provide a second class set having a second plurality of error value ranges different in size from the first plurality of error value ranges, such that error value ranges encompassing error values having a greater frequency of occurrence are increased in size to encompass a wider range of error values, thereby decreasing the compression ratio; and if the number of bits utilized is less than the predetermined compression ratio, modifying the first plurality of error value ranges for the first class set to provide a second class set having a second plurality of error value ranges different in size from the first plurality of error value ranges, such that error value ranges encompassing error values having a greater frequency of occurrence are decreased in size to encompass a narrower range of error values, thereby increasing the compression ratio; such that error value ranges are adapted to maintain the compressed data stream in the proximity of the predetermined compression ratio.

14. A method for compressing a stream of data values at a predetermined compression ratio, said method comprising the steps of:

establishing at least one binary decision tree for the data values, said binary decision tree having a plurality of leaf nodes and at least one non-leaf node arranged in a binary rooted tree, each leaf node represented by pairs of threshold error values, each member of each pair of threshold error values representing a leaf node in the binary decision tree and a threshold of a range of data values and each said at least one non-leaf node representing a binary decision required to arrive at the appropriate leaf node;

identifying a range of error values that the data value is within;

quantizing the data value, wherein the step of quantizing the data value includes the step of generating a binary code according to the range of error values the data value is within and a path address of the node corresponding to the range threshold;

entropy coding said binary code, such that the stream of data values are output as a compressed bit stream after outputting a binary code for a predetermined number of data values, comparing a number of bits utilized to output the compressed bit stream representing data values to the predetermined compression ratio;

if the number of bits utilized is greater than the number of bits dictated by the predetermined compression ratio, increasing the ranges of error values in size by increasing the values of the threshold values, such that ranges represented by nodes closer to a root node in the binary rooted tree, and therefore identified by a binary code having a lessor number of bits, are increased in size to encompass a wider range of data values, thereby decreasing the compression ratio; and if the number of bits utilized is less than the number of bits dictated by the predetermined compression ratio, decreasing the ranges of error values in size by decreasing the values of the threshold values, such that ranges represented by nodes closer to the root node are decreased in size to encompass a narrower range of data values, thereby increasing the compression ratio;

such that ranges of error values are adapted to maintain the compressed data stream in the proximity of the predetermined compression ratio.

15. The method for compressing a stream of data values as set forth in claim 14, further comprising the steps of:

predicting the value of the data value to be quantized, wherein a predicted data value is produced; and generating an error value from the difference between the predicted data value and the data value to be quantized, said threshold values representative of threshold values for ranges of error values, such that said binary decision tree represents a range of error values and binary codes are generated for the error values.

16. The method for compressing a stream of data values as set forth in claim 14 or 15, wherein the data values comprise a plurality of pixels representative of a digital image.

17. The method as set forth in claim 14, wherein the threshold values are determined according to a set of possible data values and a desired quantization granularity of zones.

18. The method as set forth in claim 13, further comprising decompressing the compressed data, comprising the steps of:

decoding the class code to identify the class code of the data value;

determining the range of error values from the encoded class code;

selecting an error value from the range of error values;

generating a predicted data value for the data value to be decompressed;

constructing the compressed data value from the selected error value and the predicted data value.

19. The method as set forth in claim 18 further comprising the steps of determining the midpoint of the range determined from the encoded class code as the selected error value, and further comprising the step of adding error value to the predicted value to decompress the compressed data.

20. The method as set forth in claim 14, further comprising decompressing the compressed data, comprising the steps of:

decoding the class code to identify the class code of the data value;

determining the range of error values from the encoded class code;

selecting an error value from the range of error values;

generating a predicted data value for the data value to be decompressed;

constructing the compressed data value from the selected error value and the predicted data value.

21. The method as set forth in claim 20 further comprising the steps of determining the midpoint of the range determined from the encoded class code as the selected error value, and further comprising the step of adding the selected error value to the predicted value to decompress the compressed data.

22. An apparatus for compressing a stream of data values at a predetermined compression ratio comprising:

at least one binary decision tree for encoding the data error values, said binary decision tree comprising a root node and a plurality of binary nodes represented by pairs of threshold values, each member of each pair of threshold values representing a node in the binary decision tree and a threshold of a range of data error values;

a first look-up table for storing threshold values for different quantization granularities, each of said threshold values representing a threshold of a range of values and organized in groups according to the quantization granularity, said range of values identified by a class code identifying a binary path from the root node to the node corresponding to the threshold value.

selection means for selecting a first quantization granularity to index the first look-up table;

comparison means for identifying a range of values in the selected quantization granularity within which the input data value lies, said comparison means comparing the data value to the threshold values of the group selected according to the first quantization granularity from the first lookup table;

generation means for generating a binary code, said binary code comprising at least one bit and determined according to the range the data value is within and the path address of the node corresponding to the range;

output means for outputting a compressed data stream wherein said compressed stream includes data representing the binary code subjected to entropy encoding;

counting means for counting a number of bits output as part of the compressed data stream;

comparison means for comparing the number of bits utilized to output the compressed data stream to the predetermined compression ratio;

quantization granularity control means for updating the quantization granularity of the group of threshold values, if the number of bits utilized is greater than the predetermined compression ratio, said control means controls said selections means to select a second quantization granularity that is coarser than the first quantization granularity, such that groups encompassing error values having a greater frequency of occurrence having a class code employing a lessor number of bits are increased in size to encompass a wider range of error values thereby decreasing the compression ratio; and if the number of bits utilized is less than the predetermined compression ratio, said control means controls said selections means to select a second quantization granularity that is finer than the first quantization granularity such that groups encompassing error values having a greater frequency of occurrence having a class code employing a lessor number of bits are decreased in size to encompass a narrower range of error values thereby increasing the compression ratio, such that error ranges are adapted to maintain the compressed data stream in the proximity of the predetermined compression ratio.

23. The apparatus as set forth in claim 22, further comprising a zone bias which is input to the selection means to bias the quantization granularity to index the first look-up table.

24. The apparatus as set forth in claim 22 further comprising:

a predictor for generating a predicted data value for the data value to be quantized;

subtraction means for determining the error value for the data value to be quantized to be the difference between the data value and the predicted data value, wherein said threshold values are representative of threshold values for ranges of error values, and said binary decision tree represents a range of error values and binary codes are generated for the error values.

25. The apparatus as set forth in claim 24, wherein the data values to be compressed comprise a plurality of pixels representative of a digital image.

26. The apparatus as set forth in claim 24, further comprising a decompressor for reconstructing the data value from the class code, comprising:

a decoder for decoding the class code to identify the class code of the data value;

a second look up table comprising error values corresponding to the class codes at a predetermined quantization coarseness, the quantization granularity determined by the selection means;

retrieval means for retrieving a representative error value from the second look up table according to the class code and the quantization coarseness;

said predictor generating a predicted data value for the data value to be reconstructed;

reconstruction means for generating the data value from the predicted data value and the class code.

27. The apparatus as set forth in claim 26, wherein the representative error value is an error value at the midpoint of the range of the error values determined from the class code.

28. A method for decompressing a stream of bits representative of data values at a predetermined decompression ratio, wherein the data values include encoded class codes used to quantize the original data values, said method comprising the steps of:

establishing a first binary decision tree for decoding the data error values, said binary decision tree comprising a root node and a plurality of binary nodes represented by pairs of symmetric threshold values, symmetric around the root node, each member of each pair of symmetric threshold values representing a node in the binary decision tree and a threshold of a range of data values, each node identified by a class code comprising bits representing a path address from the root node to the node;

decoding a stream of bits to determine the node corresponding to the error value range the data value is within;

reconstructing the data value from the error value range corresponding to the decoded node;

after decompressing a predetermined number of data values, comparing a number of input bits in the stream of bits utilized to represent the compressed data to the predetermined compression ratio;

if the number of bits utilized is greater than the number of bits dictated by the predetermined compression ratio, increasing the error value ranges in size by increasing the value of the symmetric threshold values to produce a second binary decision tree for decoding data error values such that error value ranges represented by nodes closer to the root node and identified by a binary code having a lessor number of bits, are increased in size to encompass a wider range of data error values thereby decreasing the compression ratio; and if the number of bits utilized is less than the number of bits dictated by the predetermined compression ratio, decreasing the error value ranges in size by decreasing the value of the symmetric threshold values to produce a second binary decision tree for decoding data error values such that error value ranges represented by nodes closer to the root node and identified by a binary code having a lessor number of bits, are decreased in size to encompass a narrower range of data error values thereby increasing the compression ratio;

such that the error ranges change to maintain the compressed data stream in the proximity of the predetermined compression ratio and accurately reconstruct the data values.

29. An apparatus for decompressing a stream of bits representative of data values, wherein said data values include encoded class codes used in quantizing original data values said data values compressed at a predetermined compression ratio, said apparatus comprising:

a first look-up table for storing error values for different quantization granularities, each of said error values representing a threshold of a range of data error values and organized in groups according to the quantization granularity, each said range of error values identified by a class code;

selection means for selecting a first quantization granularity to index the first look-up table and retrieve a group of error values;

means for generating a predicted data value for the data value to be quantized;

a decoder for decoding a portion of the stream of bits to produce a class code corresponding to the data value to be reconstructed;

means for determining a representative error value for the class code decoded at the selected quantization granularity from group of values retrieved from the look up table;

reconstruction means for reconstructing the data value from the predicted data value and representative error value;

counting means for counting the number of bits of the input bit stream utilized to encode class codes;

comparison means for comparing the number of bits utilized to the predetermined compression ratio;

quantization granularity control means for updating the quantization granularity of the group of threshold values, if the number of bits utilized is greater than the predetermined compression ratio, said control means controls said selections means to select a second quantization granularity that is coarser than the first quantization granularity such that the classes encompassing error values having a greater frequency of occurrence having a class code employing a lessor number of bits are increased in size to encompass a wider range of error values thereby decreasing the compression ratio; and if the number of bits utilized is less than the predetermined compression ratio, said control means controls said selections means to select a second quantization granularity that is finer than the first quantization granularity such that the classes encompassing error values having a greater frequency of occurrence having a class code employing a lessor number of bits are decreased in size to encompass a narrower range of error values thereby increasing the compression ratio;

such that error value ranges are adapted by selecting another quantization granularity to maintain the compressed data stream in the proximity of the predetermined compression ratio and accurately reconstruct the data values.

* * * * *